(12) United States Patent
Taneja et al.

(10) Patent No.: US 7,453,801 B2
(45) Date of Patent: Nov. 18, 2008

(54) ADMISSION CONTROL AND RESOURCE ALLOCATION IN A COMMUNICATION SYSTEM SUPPORTING APPLICATION FLOWS HAVING QUALITY OF SERVICE REQUIREMENTS

(75) Inventors: Mukesh Taneja, San Diego, CA (US); Rajesh Pankaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 911 days.

(21) Appl. No.: 10/425,854

(22) Filed: Apr. 28, 2003

(65) Prior Publication Data

US 2004/0013089 A1    Jan. 22, 2004

Related U.S. Application Data

(63) Continuation-in-part of application No. 10/007,297, filed on Nov. 8, 2001, now Pat. No. 6,993,006.

(60) Provisional application No. 60/455,906, filed on Mar. 17, 2003.

(51) Int. Cl.
*H04J 1/16* (2006.01)
*H04J 3/14* (2006.01)

(52) U.S. Cl. .................. 370/230; 370/229; 370/235

(58) Field of Classification Search .......... 370/229, 370/230, 230.1, 231, 234–235, 310, 395.2–395.21, 370/395.4, 395.41, 395.42, 395.43
See application file for complete search history.

(56) References Cited

U.S. PATENT DOCUMENTS

| 4,901,307 A | 2/1990 | Gilhousen et al. |
|---|---|---|
| 5,056,109 A | 10/1991 | Gilhousen et al. |
| 5,103,459 A | 4/1992 | Gilhousen et al. |
| 5,267,261 A | 11/1993 | Blakeney, II et al. |
| 5,414,796 A | 5/1995 | Jacobs et al. |
| 5,504,773 A | 4/1996 | Padovani et al. |

(Continued)

FOREIGN PATENT DOCUMENTS

CN    1408193    4/2003

(Continued)

OTHER PUBLICATIONS

Kadelka et al., "Serving IP quality of service with HiperLAN/2," *Computer Networks*, Elsevier Science Publishers B.V., Amsterdam, Netherlands, vol. 37, No. 1, Sep. 2001, pp. 17-24.

(Continued)

*Primary Examiner*—Ajit G Patel
(74) *Attorney, Agent, or Firm*—Howard Seo; Chuck E. Eggers; Thomas R. Rouse

(57) ABSTRACT

A method and apparatus for admission control in a communication system. An Access Network (AN) element determines available resources. When available resources are sufficient to support the requirements of a requested application flow, the AN admits the application flow. The AN periodically, and on trigger events, updates a measure of available resources. The admission control may operate in coordination with a scheduler applying a compensation factor to each flow type, and a compensation factor for aggregate flows of a given user.

11 Claims, 27 Drawing Sheets

U.S. PATENT DOCUMENTS

| | | | |
|---|---|---|---|
| 5,859,835 A | 1/1999 | Varma et al. | |
| 5,870,629 A | 2/1999 | Borden et al. | |
| 5,923,650 A | 7/1999 | Chen et al. | |
| 5,933,462 A | 8/1999 | Viterbi et al. | |
| 5,982,758 A | 11/1999 | Hamdy | |
| 6,028,852 A | 2/2000 | Miya et al. | |
| 6,031,827 A | 2/2000 | Rikkinen et al. | |
| 6,064,678 A | 5/2000 | Sindhushayana et al. | |
| 6,067,301 A | 5/2000 | Aatresh | |
| 6,069,872 A | 5/2000 | Bonomi et al. | |
| 6,072,800 A | 6/2000 | Lee | |
| 6,101,193 A | 8/2000 | Ohba | |
| 6,122,291 A | 9/2000 | Robinson et al. | |
| 6,128,280 A | 10/2000 | Jamoussi et al. | |
| 6,157,654 A | 12/2000 | Davis | |
| 6,229,795 B1 | 5/2001 | Pankaj et al. | |
| 6,335,922 B1 | 1/2002 | Tiedemann, Jr. et al. | |
| 6,452,933 B1 | 9/2002 | Duffield et al. | |
| 6,526,060 B1 | 2/2003 | Hughes et al. | |
| 6,574,211 B2 | 6/2003 | Padovani et al. | |
| 7,058,027 B1* | 6/2006 | Alessi et al. | 370/310.1 |
| 2001/0046208 A1 | 11/2001 | Eng | |
| 2002/0057706 A1 | 5/2002 | Michiel | |
| 2002/0061007 A1 | 5/2002 | Pankaj | |
| 2002/0181494 A1* | 12/2002 | Rhee | 370/465 |
| 2003/0214928 A1* | 11/2003 | Chuah | 370/336 |
| 2004/0022191 A1* | 2/2004 | Bernet et al. | 370/230 |
| 2004/0066785 A1* | 4/2004 | He et al. | 370/395.21 |
| 2005/0083936 A1* | 4/2005 | Ma | 370/392 |

FOREIGN PATENT DOCUMENTS

| | | |
|---|---|---|
| EP | 0886403 | 12/1998 |
| JP | 10084383 | 3/1998 |
| WO | 9637081 | 11/1996 |
| WO | 9835514 | 8/1998 |
| WO | 9845966 | 10/1998 |
| WO | 01063849 | 7/2001 |
| WO | 01/60110 A1 | 8/2001 |
| WO | 01/63849 A2 | 8/2001 |
| WO | 02007388 | 1/2002 |
| WO | 02/056564 A1 | 7/2002 |

OTHER PUBLICATIONS

Douglas C. Schmidt, David L. Levine, Sumedh Mungee: "The design of the TAO real-time object request broker," Elsevier Computer Communications, No. 21, 1998, pp. 1-31.

European Search Report EP05011081, Nov. 10, 2006.

International Search Report PCT/US00/00801, International Search Authority-EPO, Jul. 25, 2000.

International Search Report PCT/US01/00576, International Search Authority-EPO, May 11, 2001.

Calin, et al. "Traffic Scheduling and Fairness for GPRA Air Interface" IEEE Conf. 50: 834-836 (Sep. 19-22, 1999, Amsterdam).

Leong C W et al. "Call admission control for voice and data traffic in wireless communication" Computer Communications, Elsevier Science Publishers BV, Amsterdam, NL vol. 25, No. 10 Jun. 15, 2002, pp. 972-979.

International Search Report PCT/US/2004/008283, International Search Authority EPO Nov. 26, 2004.

* cited by examiner

| MODE | QoS REQUIREMENTS | QoS PARAMETERS |
|---|---|---|
| I | HIGH DELAY SENSITIVITY | RATE, DELAY, JITTER |
| II | MEDIUM DELAY SENSITIVITY | RATE, AVERAGE DELAY |
| III | RATE SENSITIVE | RATE |
| IV | NO QoS SPECIFIED | NONE |

FIG. 11

ADMISSION CONTROL AND RESOURCE ALLOCATION IN A COMMUNICATION SYSTEM SUPPORTING APPLICATION FLOWS HAVING QUALITY OF SERVICE REQUIREMENTS

CLAIM OF PRIORITY UNDER 35 U.S.C. §119

The present Application for Patent claims priority to Provisional Patent Application entitled, "System for Allocating Resources in a Communication System," filed Mar. 17, 2003, having Ser. No. 60/455,906, assigned to the assignee hereof and hereby expressly incorporated by reference herein.

CLAIM OF PRIORITY UNDER 35 U.S.C. §120

The present Application for Patent is a Continuation in Part and claims priority to patent application Ser. No. 10/007,297 entitled, "System for Allocating Resources in a Communication System," filed Nov. 8, 2001, now U.S. Pat. No. 6,993,006 assigned to the assignee hereof, and hereby expressly incorporated by reference herein.

REFERENCE TO CO-PENDING APPLICATION FOR PATENT

The present Application for Patent is related to the co-pending U.S. Patent Application entitled "Resource Allocation in a Communication System Supporting Application Flows Having Quality of Service Requirements," having filed concurrently herewith, assigned to the assignee hereof, and hereby expressly incorporated by reference herein.

BACKGROUND

1. Field of the Invention

The present application relates to communication systems. Particularly, these embodiments are directed to allocating communication resources among the plurality of subscribers to a communication system.

2. Related Art

Several solutions have been presented to address the problem of allocating limited communication resources provided by a single node in a communication system among a plurality of subscribers. It is an objective of such systems to provide sufficient resources at the nodes to satisfy the requirements of all subscribers while minimizing costs. Accordingly, such systems are typically designed with the objective of efficient allocation of resources among the various subscribers.

Various systems have implemented a Frequency Division Multiple Access (FDMA) scheme, which allocates resources to each of the subscribers concurrently. A communication node in such systems typically has a limited bandwidth for either transmitting information to or receiving information from each subscriber in the network at any point in time. This scheme typically involves allocating distinct portions of the total bandwidth to the individual subscribers. While such a scheme may be effective for systems in which subscribers require uninterrupted communication with the communication node, better utilization of the total bandwidth may be achieved when such constant, uninterrupted communication is not required.

Other schemes for allocating communication resources of a single communication node among a plurality of subscribers include Time Division Multiple Access (TDMA) schemes. These TDMA schemes are particularly effective in allocating the limited bandwidth resources of a single communication node among a plurality of subscribers, wherein users do not require constant, uninterrupted communication with the single communication node. TDMA schemes typically dedicate the entire bandwidth of the single communication node to each of the subscribers at designated time intervals. In a wireless communication system which employs a Code Division-Multiple Access (CDMA) scheme, this may be accomplished by assigning to each of the subscriber units all code channels at the designated time intervals on a time multiplexed basis. The communication node implements the unique carrier frequency or channel code associated with the subscriber to enable exclusive communication with the subscriber. TDMA schemes may also be implemented in land line systems using physical contact relay switching or packet switching.

TDMA systems typically allocate equal time intervals to each subscriber in a round robin fashion. This may result in under utilization of certain time intervals by certain subscribers. Similarly, other subscribers may have communication resource requirements, which exceed the allocated time interval, leaving these subscribers under served. The system operator may choose to either incur the cost of increasing the bandwidth of the node to ensure that no subscribers are under-served, or allow under-served subscribers to continue to be under-served.

Accordingly, there is a need to provide a system and method of allocating communication resources among subscribers to a communication network efficiently and fairly according to a network policy of allocating the communication resources among the subscribers. Consistent therewith, there is a need to maximize the number of users served by the system, including, but not limited to, providing mechanisms for performing resource allocation on a per flow basis and/or on an aggregate basis in response to the specific requirements, constraints, and/or goals of the system. Still further there is a need for admission control and preemption methods which optimize resource allocation.

BRIEF DESCRIPTION OF THE FIGURES

FIG. 11 is a table identifying class types according to one embodiment.

DETAILED DESCRIPTION

Embodiments of the present invention are directed to a system and apparatus for allocating resources among a plurality of subscribers to a communication network, which are serviced by a single communication node. At individual discrete transmission intervals, or "service intervals," individual subscribers seize a finite resource of the communication node to the exclusion of all other subscribers. The individual subscribers are selected to seize the finite resource based upon a weight or score associated with the individual subscribers. Changes in a weight associated with an individual subscriber are preferably based upon an instantaneous rate at which the individual subscriber is capable of consuming the finite resource.

Figure 1:
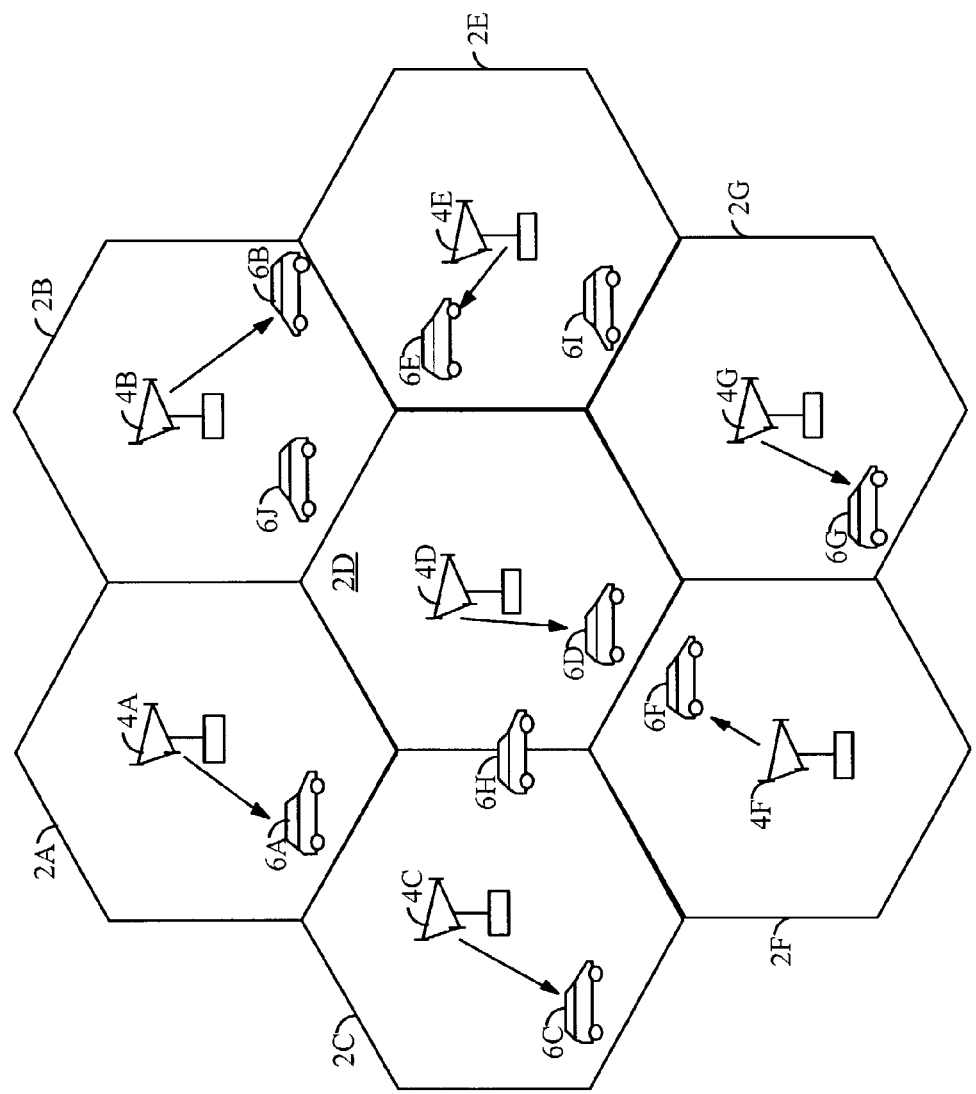
FIG. 1 shows a communication network according to an embodiment of the present invention.

Referring to the figures, FIG. 1 represents an exemplary variable rate communication system. One such system is described in the U.S. patent application Ser. No. 08/963,386, entitled Method and Apparatus for High Rate Packet Data Transmission, filed on Nov. 3, 1997, assigned to Qualcomm, Inc. and incorporated herein by reference. The variable rate communication system comprises multiple cells 2A-2G. Each cell 2 is serviced by a corresponding base station 4. Various remote stations 6 are dispersed throughout the communication system. In the exemplary embodiment, each of remote stations 6 communicates with at most one base station 4 on a forward link at any data transmission interval. For example, base station 4A transmits data exclusively to remote station 6A, base station 4B transmits data exclusively to remote station 6B, and base station 4C transmits data exclusively to remote station 6C on the forward link at time slot n. As shown by FIG. 1, each base station 4 preferably transmits data to one remote station 6 at any given moment. In other embodiments, the base station 4 may communicate with more than one remote station 6 at a particular data transmission interval to the exclusion of all other remote stations 6 associated with the base station 4. In addition, the data rate is variable and in one embodiment is dependent on the carrier-to-interference ratio (C/I) as measured by the receiving remote station 6 and the required energy-per-bit-to-noise ratio ($E_b/N_o$). The reverse link from remote stations 6 to base stations 4 is not shown in FIG. 1 for simplicity. According to an embodiment, the remote stations 6 are mobile units with wireless transceivers operated by wireless data service subscribers.

Figure 2A:
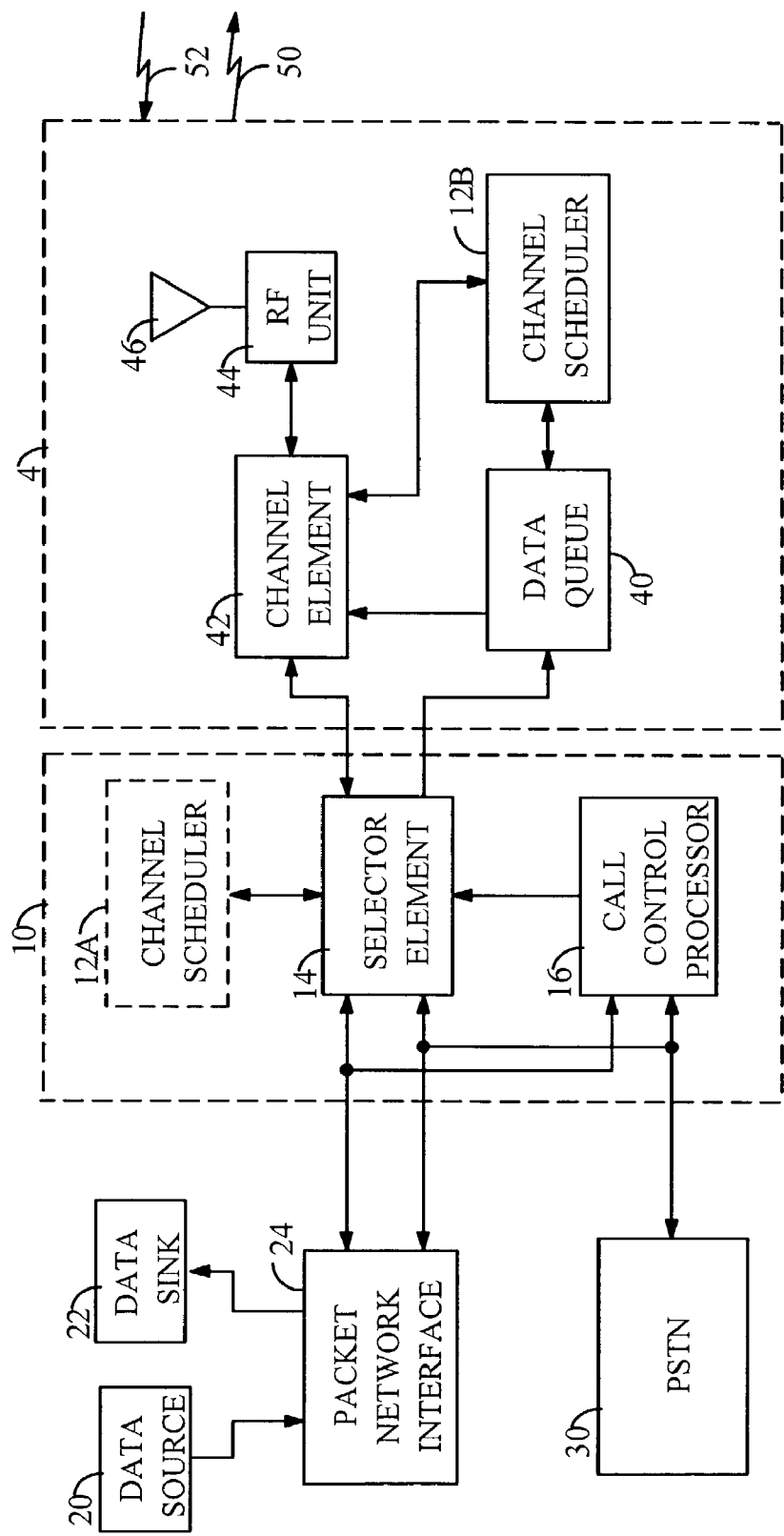
FIG. 2A shows a block diagram of a base station controller and base station apparatus configured in accordance with an embodiment of the present invention.
Figure 2B:
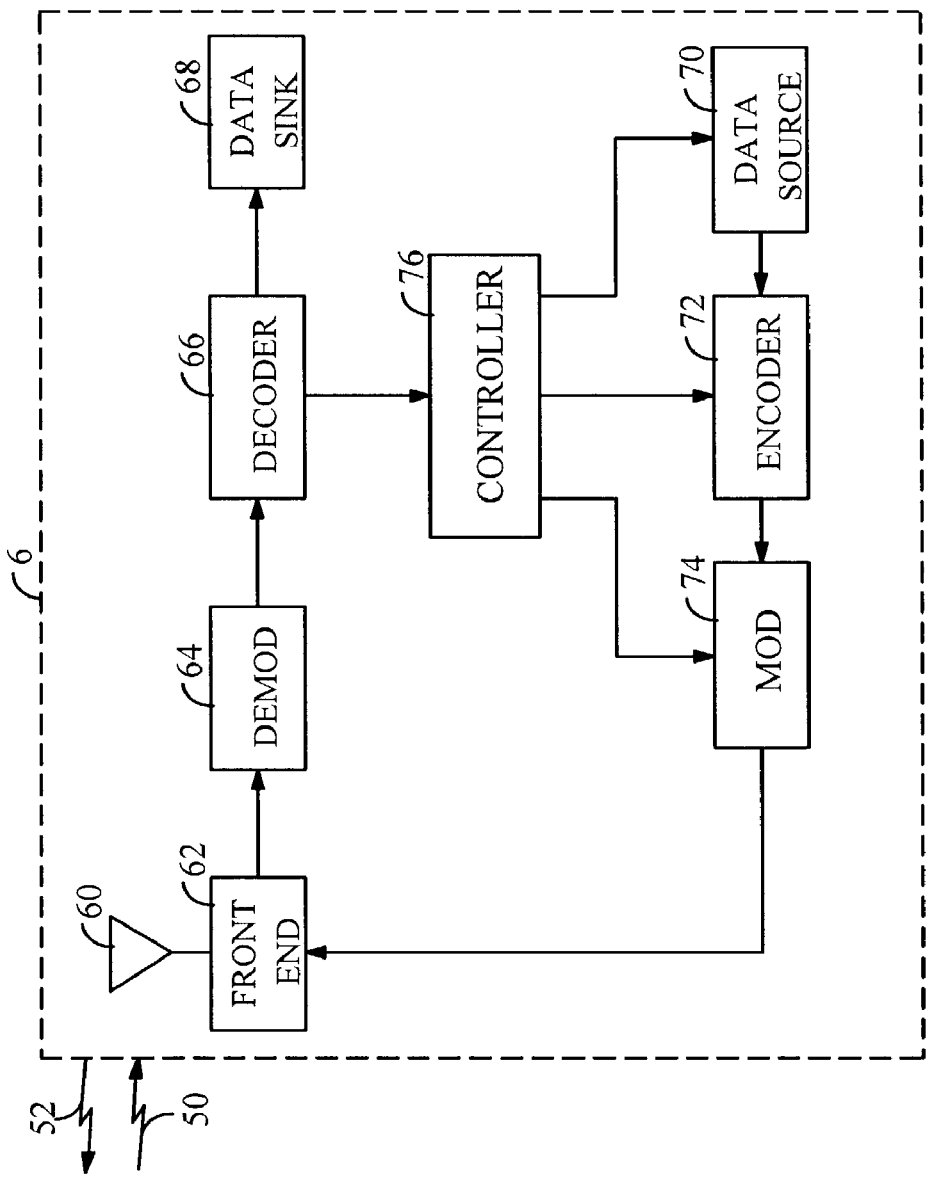
FIG. 2B shows a block diagram of a remote station apparatus configured in accordance with an embodiment of the present invention.

A block diagram illustrating the basic subsystems of an exemplary variable rate communication system is shown in FIGS. 2A-2B. Base station controller 10 interfaces with packet network interface 24, Public Switched Telephone Network (PSTN) 30, and all base stations 4 in the communication system (only one base station 4 is shown in FIG. 2 for simplicity). Base station controller 10 coordinates the communication between remote stations 6 in the communication system and other users connected to packet network interface 24 and PSTN 30. PSTN 30 interfaces with users through a standard telephone network (not shown in FIG. 2).

Base station controller 10 contains many selector elements 14, although only one is shown in FIG. 2A for simplicity. Each selector element 14 is assigned to control communication between one or more base stations 4 and one remote station 6. If selector element 14 has not been assigned to remote station 6, call control processor 16 is informed of the need to page remote station 6. Call control processor 16 then directs base station 4 to page remote station 6.

Data source 20 contains a quantity of data, which is to be transmitted to the remote station 6. Data source 20 provides the data to packet network interface 24. Packet network interface 24 receives the data and routes the data to the selector element 14. Selector element 14 transmits the data to each base station 4 in communication with remote station 6. In the exemplary embodiment, each base station 4 maintains a data queue 40 which stores the data to be transmitted to the remote station 6.

The data is transmitted in data packets from data queue 40 to channel element 42. In the exemplary embodiment, on the forward link, a "data packet" refers to a quantity of data, which is the maximum of 1024 bits and a quantity of data to be transmitted to a destination remote station 6 within a "time slot" (such as≈1.667 msec). For each data packet, channel element 42 inserts the necessary control fields. In the exemplary embodiment, channel element 42 CRC encodes the data packet and control fields and inserts a set of code tail bits. The data packet, control fields, CRC parity bits, and code tail bits comprise a formatted packet. In the exemplary embodiment, channel element 42 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 44 which quadrature modulates, filters, and amplifies the signal. The forward link signal is transmitted over the air through antenna 46 on forward link 50.

At remote station 6, the forward link signal is received by antenna 60 and routed to a receiver within front end 62. The receiver filters, amplifies, quadrature demodulates, and quantizes the signal. The digitized signal is provided to demodulator (DEMOD) 64 where it is despread with the short PNI and PNQ codes and decovered with the Walsh cover. The demodulated data is provided to decoder 66 which performs the inverse of the signal processing functions done at base station 4, specifically the de-interleaving, decoding, and CRC check functions. The decoded data is provided to data sink 68.

The hardware, as pointed out above, supports variable rate transmissions of data, messaging, voice, video, and other communications over the forward link. The rate of data transmitted from the data queue 40 varies to accommodate changes in signal strength and the noise environment at the remote station 6. Each of the remote stations 6 preferably transmits a Data Rate Control (DRC) signal to an associated base station 4 at each time slot. DRC refers to a control mechanism whereby a remote station determines a desired data rate for the forward link, i.e., data rate to receive data at the remote station. The remote station sends the desired data rate as a data rate request or instruction to the base station via a DRC message. The DRC signal provides information to the base station 4, which includes the identity of the remote station 6 and the rate at which the remote station 6 is to receive data from its associated data queue. Accordingly, circuitry at the remote station 6 measures the signal strength and estimates the noise environment at the remote station 6 to determine the rate information is to be transmitted in the DRC signal.

The DRC signal transmitted by each remote station 6 travels through reverse link channel 52 and is received at base station 4 through antenna 46 and RF unit 44. In the exemplary embodiment, the DRC information is demodulated in channel element 42 and provided to a channel scheduler 12A located in the base station controller 10 or to a channel scheduler 12B located in the base station 4. In a first exemplary embodiment, the channel scheduler 12B is located in the base station 4. In an alternate embodiment, the channel scheduler 12A is located in the base station controller 10, and connects to all selector elements 14 within the base station controller 10.

In one embodiment, channel scheduler 12B receives information from data queue 40 indicating the amount of data queued up for each remote station, also called queue size. Channel scheduler 12B then performs scheduling based on DRC information and queue size for each remote station serviced by base station 4. If queue size is required for a scheduling algorithm used in the alternate embodiment, channel scheduler 12A may receive queue size information from selector element 14.

Embodiments of the present invention are applicable to other hardware architectures, which may support variable rate transmissions. The present invention may be readily extended to cover variable rate transmissions on the reverse link. For example, instead of determining the rate of receiving data at the base station 4 based upon a DRC signal from remote stations 6, the base station 4 measures the strength of the signal received from the remote stations 6 and estimates the noise environment to determine a rate of receiving data from the remote station 6. The base station 4 then transmits to each associated remote station 6 the rate at which data is to be transmitted in the reverse link from the remote station 6. The base station 4 may then schedule transmissions on the reverse link based upon the different data rates on the reverse link in a manner similar to that described herein for the forward link.

Also, a base station 4 of the embodiment discussed above transmits to a selected one, or selected ones, of the remote stations 6 to the exclusion of the remaining remote stations associated with the base station 4 using CDMA scheme. At any particular time, the base station 4 transmits to the selected one, or selected ones, of the remote station 6 by using a code, which is assigned to the receiving base station(s) 4. However, the present invention is also applicable to other systems employing different TDMA methods for providing data to select base station(s) 4, to the exclusion of the other base stations 4, for allocating transmission resources optimally.

The channel scheduler 12 schedules the variable rate transmissions on the forward link. The channel scheduler 12 receives the queue size, which is indicative of the amount of data to transmit to remote station 6, and messages from remote stations 6. The channel scheduler 12 preferably schedules data transmissions to achieve the system goal of maximum data throughput while conforming to a fairness constraint.

As shown in FIG. 1, remote stations 6 are dispersed throughout the communication system and may be in communication with zero or one base station 4 on the forward link. In the exemplary embodiment, channel scheduler 12 coordinates the forward link data transmissions over the entire communication system. A scheduling method and apparatus for high speed data transmission are described in detail in U.S. Pat. No. 6,335,922, issued Jan. 1, 2002, assigned to the assignee of the present invention and incorporated by reference herein.

According to an embodiment, the channel scheduler 12 is implemented in a computer system, which includes a processor, Random Access Memory (RAM) and a program memory for storing instructions to be executed by the processor (not shown). The processor, RAM and program memory may be dedicated to the functions of the channel scheduler 12. In other embodiments, the processor, RAM and program memory may be part of a shared computing resource for performing additional functions at the base station controller 10.

Figure 3:
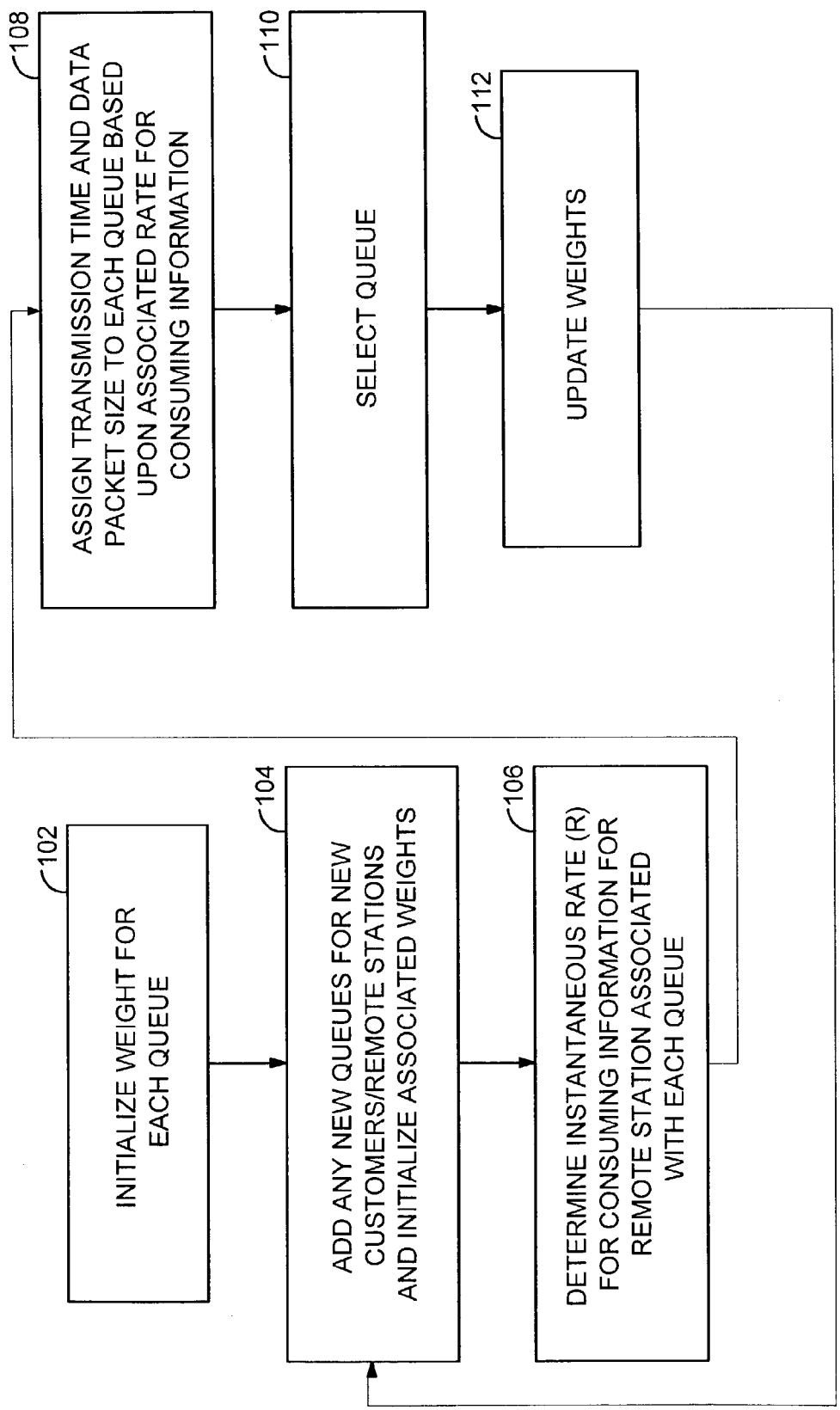
FIG. 3 shows a flow diagram illustrating the execution of a scheduling algorithm in an embodiment of the channel scheduler shown in FIG. 2A.

FIG. 3 shows an embodiment of a scheduling algorithm, which controls the channel scheduler 12 to schedule transmissions from the base station 4 to the remote stations 6. As discussed above, a data queue 40 is associated with each remote station 6. The channel scheduler 12 associates each of the data queues 40 with a "weight" which is evaluated at a step 110 for selecting the particular remote station 6 associated with the base station 4 to receive data in a subsequent service interval. The channel scheduler 12 selects individual remote stations 6 to receive a data transmission in discrete service intervals. At step 102, the channel scheduler initializes the weight for each queue associated with the base station 4.

A channel scheduler 12 cycles through steps 104 through 112 at transmission intervals or service intervals. At step 104, the channel scheduler 12 determines whether there are any additional queues to be added due to the association of an additional remote station 6 with the base station 4 detected in the previous service interval. The channel scheduler 12 also initializes the weights associated with the new queues at step 104. As discussed above, the base station 4 receives the DRC signal from each remote station 6 associated therewith at regular intervals, such as time slots.

This DRC signal also provides the information which the channel scheduler uses at step 106 to determine the instantaneous rate for consuming information (or receiving transmitted data) for each of the remote stations associated with each queue. According to an embodiment, a DRC signal transmitted from any remote station 6 indicates that the remote station 6 is capable of receiving data at any one of multiple effective data rates.

The channel scheduler 12 at step 108 determines the length of a service interval during which data is to be transmitted to any particular remote station 6 based upon the remote station's 6 associated instantaneous rate for receiving data (as indicated in the most recently received DRC signal). According to an embodiment, the instantaneous rate of receiving data $R_i$ determines the service interval length $L_i$ associated with a particular data queue at step 106.

The channel scheduler 12 at step 110 selects the particular data queue for transmission. The associated quantity of data to be transmitted is then retrieved from a data queue 40 and then provided to the channel element 42 for transmission to the remote station 6 associated with the data queue 40. As discussed below, the channel scheduler 12 at step 110 selects the queue for providing the data, which is transmitted in a following service interval using information including each weight associated with each queue. The weight associated with the transmitted queue is then updated at step 112.

One skilled in the art will appreciate that channel scheduler 12 may be implemented using a variety of approaches without departing from the present invention. For example, channel scheduler 12 may be implemented using a computer system including a processor, random access memory (RAM) and a program memory for storing instructions to be executed by the processor (not shown). In other embodiments, the functions of channel scheduler 12 may be incorporated into a shared computing resource also used to perform additional functions at the base station 4 or the base station controller 10. In addition, the processor used to perform channel scheduler functions may be a general-purpose microprocessor, digital signal processor (DSP), programmable logic device, application specific integrated circuit (ASIC), or other device capable of performing the algorithms described herein, without departing from the present invention.

As shown in the embodiment of FIG. 1, the remote stations 6 are mobile and capable of changing associations among the different base stations 4. For example, a remote station 6F is initially receiving data transmissions from the base station 4F. The remote station 6f may then move out of the cell of the base station 4F and into the cell of the base station 4G. The remote station 6F may then start transmitting a DRC signal to alert the base station 4G instead of the base station 4F. By not receiving a DRC signal from the remote station 6F, logic at the base station 4F deduces that the remote station 6f has disengaged and is no longer to receive data transmissions. The data queue associated with the remote station 6F may then be transmitted to the base station 4G via a land line or RF communication link.

Adaptive Weighted Scheduling Algorithm

Still further, a problem exists when multimedia services, or other services having a variety of transmission requirements, are transmitted in a wireless communication system, wherein the multimedia service transmissions, referred to as "flows" (which are described further hereinbelow), create bursty traffic. Bursty traffic is characterized by several variables, including a measure of burstiness, and an average data rate. Additionally, there is a need to satisfy Quality of Service (QoS) requirements for each of the various flows in the system. The current scheduling methods, such as the Proportional Fair (PF) algorithm, generally select a flow to serve based upon a metric given as a ratio of a requested data rate, referred to as Data Rate Control data request or "DRC," to throughput, identified as "T." Such calculations may not guarantee the required QoS of all users. Therefore, pure PF algorithms may not provide sufficient complexity to satisfy the QoS requirements of users accessing multimedia or other applications. There is a need for a scheduler able to satisfy these various requirements.

Note that the following discussion considers a cdma2000 system supporting High Rate Packet Data (HRPD) services as described in IS-856. This system is used as an example. The present invention is applicable to other systems wherein users are selected for service according to a scheduling algorithm In an HRPD system, the air interface may support up to four parallel application streams. The first stream carries signaling information, and the other three may be used to carry applications with different Quality of Service (QoS) requirements or other applications.

The following glossary is provided for clarity in understanding one embodiment presented hereinbelow. The following glossary is not intended to be exhaustive. The following glossary is not intended to limit the present invention thereto, but rather is provided for clarity and understanding with respect to one embodiment of a communication system supporting an adaptive weighted scheduling algorithm.

GLOSSARY

Access Network (AN)—the network equipment providing data connectivity between a cellular network and a packet switched data network (typically the Internet) and the ATs. An AN in an HRPD system is equivalent to a base station in a cellular communication system.

Access Terminal (AT)—a device providing data connectivity to a user. An AT in an HRPD system corresponds to a mobile station in a cellular communication system. An AT may be connected to a computing device such as a laptop personal computer or it may be a self-contained data device such as a Personal Digital Assistant (PDA).

Application flow—the designated transmission path from source to AT for a given application stream. Each application flow is identified by a source, destination, traffic profile and quality of service profile.

Application stream—a data communication corresponding to an application. Most applications streams have designated quality of service requirements.

Automatic repeat request (ARQ)—a mechanism whereby the transmitter initiates a retransmission of data based on occurrence or non-occurrence of an event.

Avail(t): the unreserved bandwidth at time t on the Forward Link.

Average data rate (r)—average input data rate over time for a given application flow.

Average delay (AvgD)—average of the delay incurred over multiple packets or bits from an AN to an AT.

Burstiness ($\sigma$)—measure of the burstiness or density and relation in time of packets in an application flow.

Data Rate Control (DRC)—a mechanism whereby an AT transmits a requested data rate to the AN.

Deficit Packets (defpkts)—defined for flow k at the beginning of slot n. The deficit packet is a packet not yet transmitted in the flow, and defpkts is specifically defined as the number of equal-size packets, for example mid-processing packets such as Medium Access Control (MAC) packets, that have stayed in the BTS longer than the delay threshold for flow k.

Deficit Bits (defbits)—number of bits corresponding to the deficit packets.

Delay bound—specified time allowed for transmission of a packet of data from AN to AT.

Delay threshold—function of delay bound or jitter bound and used to compute defpkts.

Delay compensation factor ($\Phi$)—compensation factor used to compensate for delay violations.

DRC compensation factor ($\beta$)—compensation factor accounting for data request requirements associated with a user of an application flow. Used to do graceful recovery of applications.

Enhanced Jitter Threshold (dv)—used for computation of enhanced jitter compensation function on detection of jitter violation between two consecutive IP packets of a flow.

Flow weight (w)—initial weight value applied to each application flow using an adaptive weighted scheduling algorithm. Adaptive weight (aw), is the adaptive value of the weight.

Forward Link (FL)—transmission air link from AN to AT.

Head Of Line (HOL) packet—first packet in a queue.

High Rate Packet Data (HRPD)—a data service transmitting packet data communications at a high data rate. Also referred to as High Data Rate (HDR), and specified in the IS-856 standard entitled "cdma2000 High Rate Packet Data Air Interface Specification."

Jitter—time variation between received successive packets.

Jitter bound (j)—bound on the jitter for a given application flow.

Jitter compensation factor, Enhanced ($\delta$)—compensation factor to compensate for jitter violations for a flow.

$L_{max}$—Maximum rate at which a BTS may transmit data on the Forward Link (e.g., 2.4 Mbps in a cdma2000 1xEV-DO type network).

L(t)—an estimate of the Forward Link capacity to reserve at time t based upon previous QoS violation statistics and network load related statistics Normalized Deficit Packets (ndefpkts)—normalized deficit packets computed using deficit packets and required rate of that flow.

Normalized Deficit Bits (ndefbits)—normalized deficit bits corresponding to normalized deficit packets.

Motion Pictures Experts Group (MPEG)—protocol for transmission of multimedia materials.

Pending packets—$pend_{k,j}[n]$—number of pending bytes of IP packet j of flow k in the BTS and BSC in the slot n.

Proportional Fair (PF) algorithm—a scheduling algorithm wherein data communications are scheduled according to a selection factor calculated for each AT as a ratio of a requested data rate to throughput.

Quality of Service (QoS)—requirements relating to transmission of a packet data communication, including but not limited to, delay, required rate, and jitter.

QoS and network compensation functions ($\Phi$, $\gamma$, $\alpha$, $\beta$, $\delta$)—compensation functions as used in the adaptive weighted scheduling algorithm.

Quality of Service Group (QSG)—group of application types that have similar QoS requirements.

Rate compensation factor ($\alpha$)—compensation factor calculated to compensate for rate violations.

Rate of Service (R) or required rate (required_rate)—rate requested by a flow.

Res(t): Reserved bandwidth at time t on the Forward Link.

Retransmission queue (Rx)—Retransmission queue storing application flows scheduled for retransmission.

Reverse Link (RL)—transmission air link from AT to AN.

Selection metric (Y)—metric used for comparison of application flows for scheduling determinations.

Traffic Profile ($\sigma$, r)—measures relating to burstiness and data rate.

Transmission queue (Tx)—Transmission queue storing application flows for a given BTS.

Waiting time parameter ($\gamma$)—measure of waiting time for the HOL of an IP packet within the AN.

Applying Adaptive Weights to the Proportion Fair Scheduling Algorithm

A Proportional Fair (PF) scheduling algorithm, which selects a flow to serve based upon the metric DRC/T, is described for the Forward Link of a cdma2000 1xEV-DO network. The PF algorithm is designed to provide each user with approximately the same number of transmission slots. To enhance such a scheduling algorithm, described herein is an adaptive weighted DRC/T algorithm, which extends and optimizes the DRC/T algorithm to satisfy the various QoS requirements for different types of applications. Each multimedia application has a respective, specified QoS requirement. The goals of a scheduling algorithm include satisfying the various QoS requirements. The adaptive algorithm, also referred to as adaptive w*DRC/T algorithm, presented herein provides a variety of performance benefits over the DRC/T algorithm for forward link of a cdma2000 1xEV-DO network wherein application flows include multimedia application services. Delay and jitter bound requirements of delay and jitter sensitive applications on forward link of a cdma2000 1xEV-DO network are satisfied using an adaptive algorithm. Further, an adaptive scheduling algorithm ensures that rate requirements are met and the average delay is reduced for multimedia applications. While multimedia applications are provided as an example to illustrate implementation of an adaptive scheduling algorithm, the methods and apparatus described herein may be applied to other applications having QoS requirements or other quantifiable requirements associated therewith.

For applications having rate and latency requirements, such as web browsing and gaming, an adaptive scheduling algorithm provides rate guarantees and reduces average delay. For other applications having only rate requirements, an adaptive weighted scheduling algorithm may be used to satisfy the rate guarantees. While providing these QoS guarantees, an adaptive weighted scheduling algorithm also works to maintain the total throughput at a reasonably high level, and achieving a total throughput close to that achieved when a pure PF scheduling algorithm is used. A pure PF scheduling algorithm refers to an algorithm employing the DRC/T calculation. While giving extra resources to flows with QoS violations, an adaptive weighted scheduling algorithm distributes available resources in a fair manner. Various compensation mechanisms consistent therewith are provided herein.

Figure 4:
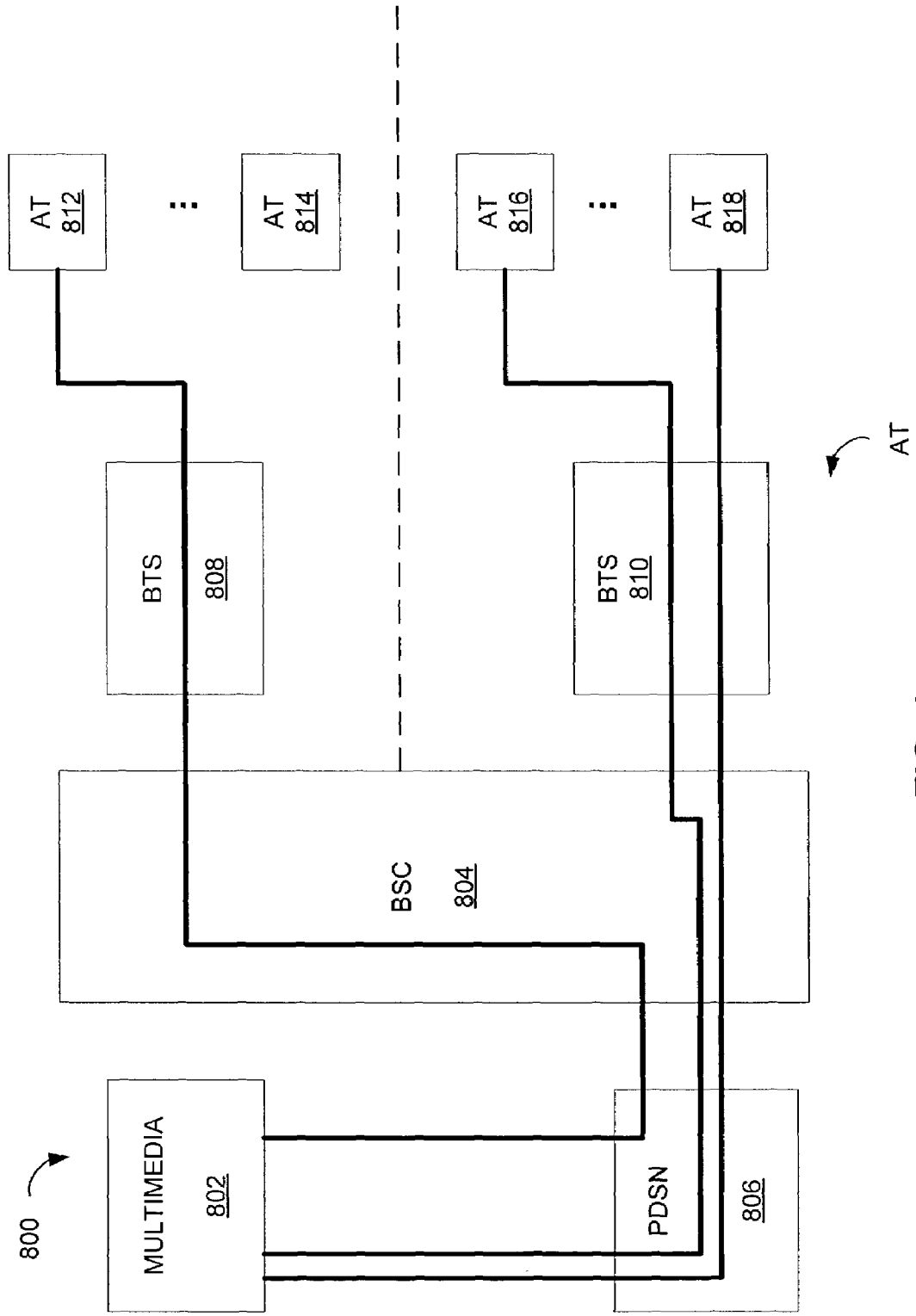
FIG. 4 is a communication system supporting multimedia applications, wherein each application communication is represented by an application flow.

FIG. 4 illustrates a system 800, which supports multimedia applications. Note again that the present invention is applicable to other systems wherein flows have QoS requirements. System 800 includes multimedia source 802 coupled to a Packet Data Service Node (PDSN) 806. The PDSN 806 is also coupled to the Base Station Controller (BSC) 804, which may include multiple BSCs. The BSC 804 communicates with the various ATs 812, 814, 816, 818, etc., via Base Station Transceiver Systems (BTSs) 808, 810. The system 800 may include more BTSs and ATs than those illustrated. Three flows are illustrated: a first flow from multimedia source 802 via PDSN 806, BSC 804, and BTS 808, to AT 812; a second flow from multimedia source 802 via PDSN 806, BSC 804, and BTS 810, to AT 816; and a third flow from multimedia source 802 via PDSN 806, BSC 804, and BTS 810 to AT 818. Note that one AT may be the destination of multiple flows. In one example, transmission of a Moving Picture Experts Group (MPEG) type application separates the audio and video into separate flows.

Each application flow to be transmitted in system 800 has: an associated source address; destination address; and QoS requirements. The application flow is then scheduled for transmission from the source to the destination. The application flow traverses a path, similar to those illustrated in FIG. 4.

Figure 5:
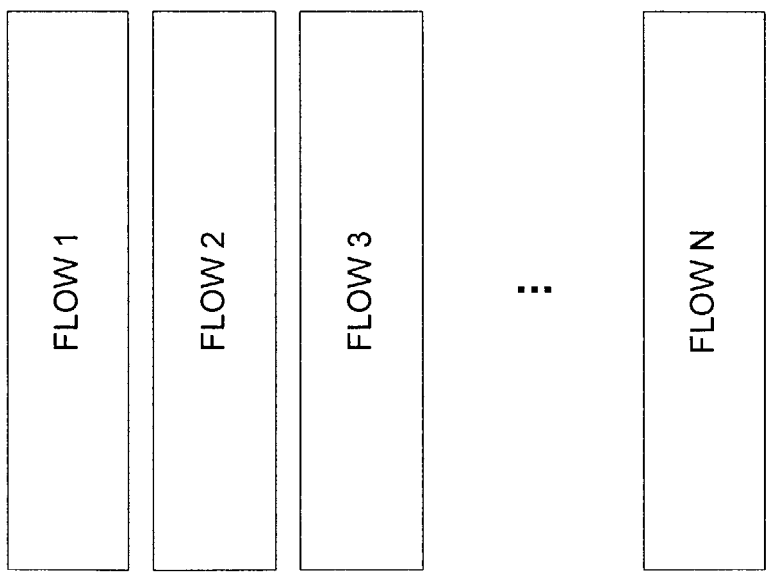
FIG. 5 is an application flow queue.

Each BTS 808, 810 is adapted to maintain a queue of flows as illustrated in FIG. 5. Note, each BTS maintains one set of queues corresponding to each application flow on its Forward Link (FL). One application flow is directed to one AT. Note, however, multiple flows may be directed to an AT. Each flow has a Quality of Service Group (QSG) type associated therewith. Each QSG is defined by a set of QoS parameters. Each flow of a given QSG has specific values for each of the parameters in the set. For example, one QSG may be defined by the set including delay and jitter. Those flows of such a QSG will specify requirements for delay and jitter. For each of the flows in a queue, the BTS maintains a set including three separate queues: (1) original transmission queue (Tx); (2) retransmission queue (Rx); and (3) automatic repeat request queue (ARQ). In one embodiment, the ARQ queue may correspond to a queue storing flows for any type repeat mechanism performed between the BTS and the MS, such as an early decision ARQ. The multimedia applications may include a delay sensitive application, such as video conferencing, having delay bound requirements. The delay bound is a specified time allowed from transmission from an AN to receipt by an AT. An adaptive weighting algorithm works to meet the delay bound requirements and to reduce the average delay experienced by IP packets of such applications. For applications having both rate and average delay requirements, an adaptive weighted scheduling algorithm works to meet the rate requirements and to reduce the average delay.

Another consideration for some types of applications, such as multimedia video applications, is the "jitter" experienced between successive packets in a multimedia transmission. Jitter refers to the variation in time between received packets. Jitter occurs when successive waveforms arrive at the receiver slightly early or late. In wireless communications, such waveforms typically convey a logical one or zero, which is then decoded at the receiver. The timing variations defined as jitter distort the visual impact of the received transmission. An adaptive weighted scheduling algorithm reduces the worst-case delay variation as well as the delay variation between consecutive packets for delay sensitive applications.

While satisfying the QoS requirements of the various users, an adaptive algorithm is also designed to meet the rate requirements of application flows when those flows are "conforming." An application flow is said to be conforming if it sends data per the pre-specified traffic profile. If flows with rate requirements are non-conforming, i.e., they send more data than pre-specified in their traffic profiles, the algorithm gives higher preference to flows with lower data rates. While the adaptive weighted algorithm is described in the context of a cdma2000 1xEV-DO network herein, the concepts and methods may be applied to other types of wireless networks as well.

With respect to the multimedia application flows, each flow is defined by: (1) traffic profile; (2) QoS profile; (3) Internet Protocol (IP) source address; and (4) IP destination address. A flow may also include: (5) L4 protocol type; (6) L4 Port Number; and (7) L4 Destination Port Number, wherein L4 refers to the Transfer Control Protocol (TCP)/Unreliable Datagram Protocol (UDP) layer in a protocol stack. For example, MPEG-audio and MPEG-video flows corresponding to an MPEG application may be treated as separate flows.

Each flow is specified by a traffic profile and is monitored or shaped to ensure that it conforms to that traffic profile. The traffic profile is defined by a variable representing a measure of burstiness, identified as a, and the average data rate of the flow, identified as r. Each flow is, therefore, described by a traffic profile (σ, r.) The QoS profile is defined by at least one of the following parameters: (1) delay bound, identified as "D," which defines the time allowed from transmission to receipt for an IP packet. For multimedia application flows, a system may specify the delay bound. For some other application flows, such as web browsing, the system may specify average delay (AvgD) in place of or in addition to delay bound; (2) jitter bound, identified as "j," which defines the maximum allowable variation in time between received packets at the AT; (3) and a rate of service (or required rate), identified as "R" or "req_rate".

Figure 6:
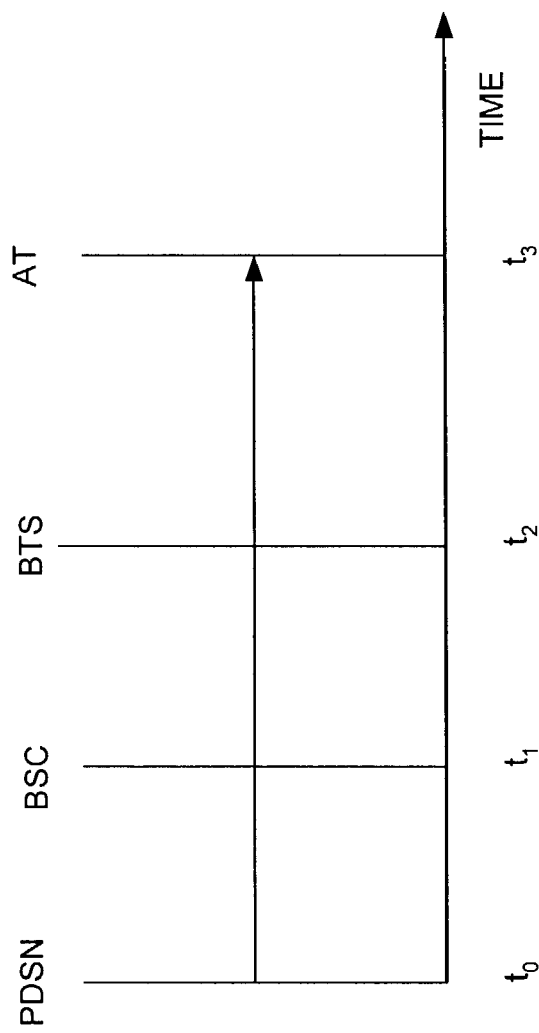
FIG. 6 is a timing diagram illustrating signal timing of part of an application flow.

To define the delay bound D, refer to FIG. 6, which is a timing diagram including various AN elements and an AT. A multimedia flow is transmitted from the multimedia source (not shown) via the PDSN, BSC, and BTS to the AT. An IP packet is transmitted from the PDSN at time $t_0$, and is received at the AT at time $t_3$. The parameter D defines the maximum allowable time from time $t_0$ to time $t_3$, i.e., D specifies the limit(s) of $t_3$-$t_0$.

Figure 7A:
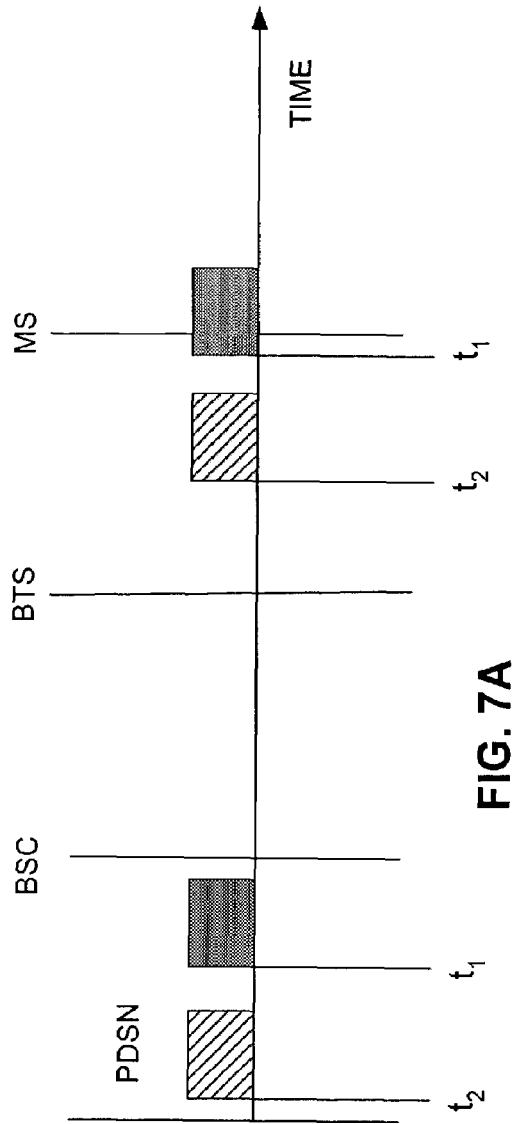
FIG. 7A is a timing diagram illustrating jitter measurements for an application flow.
Figure 7B:
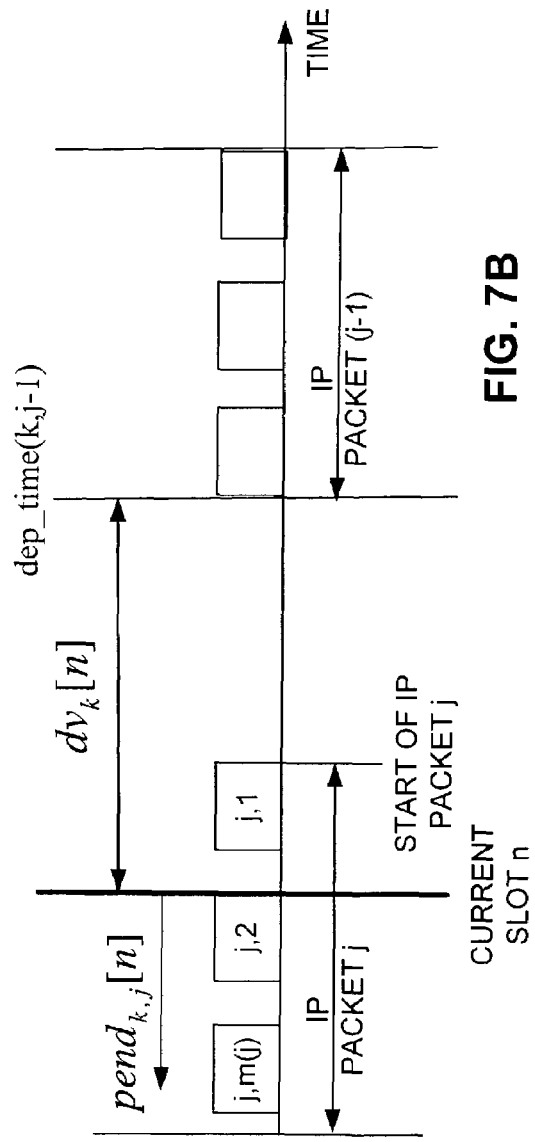
FIG. 7B is a timing diagram illustrating transmission of successive IP packets during time slots for processing an application flow.

To define the jitter bound, j, refer to FIG. 7A, which is a timing diagram including the AN elements and an AT. A first packet is transmitted at time $t_1$ from the PDSN and is received at time $t_1'$ at the AT. A second packet is transmitted at time $t_2$ from the PDSN and is received at time $t_2'$ at the AT. The jitter bound, j, defines the maximum allowable variation between successive packets, wherein the variation is given as $(t_2'-t_1')-(t_2-t_1)$. FIG. 7B further details successive IP packets transmitted over several slots.

In one embodiment, QoS profiles are categorized into groups, referred to as QoS Scheduling Groups (QSGs). Table 1 lists the categories.

TABLE 1

| Index | Delay bound (D) | Jitter bound (J) | Rate of service (R) | Average Delay (AvgD) | Examples of Applications |
|---|---|---|---|---|---|
| 1 | X | X | X | — | MPEG conference, VoIP, video streaming |
| 2 | — | — | X | X | Web browsing |
| 3 | — | — | X | — | FTP |
| 4 | — | — | — | — | Best Effort |

Figure 8:
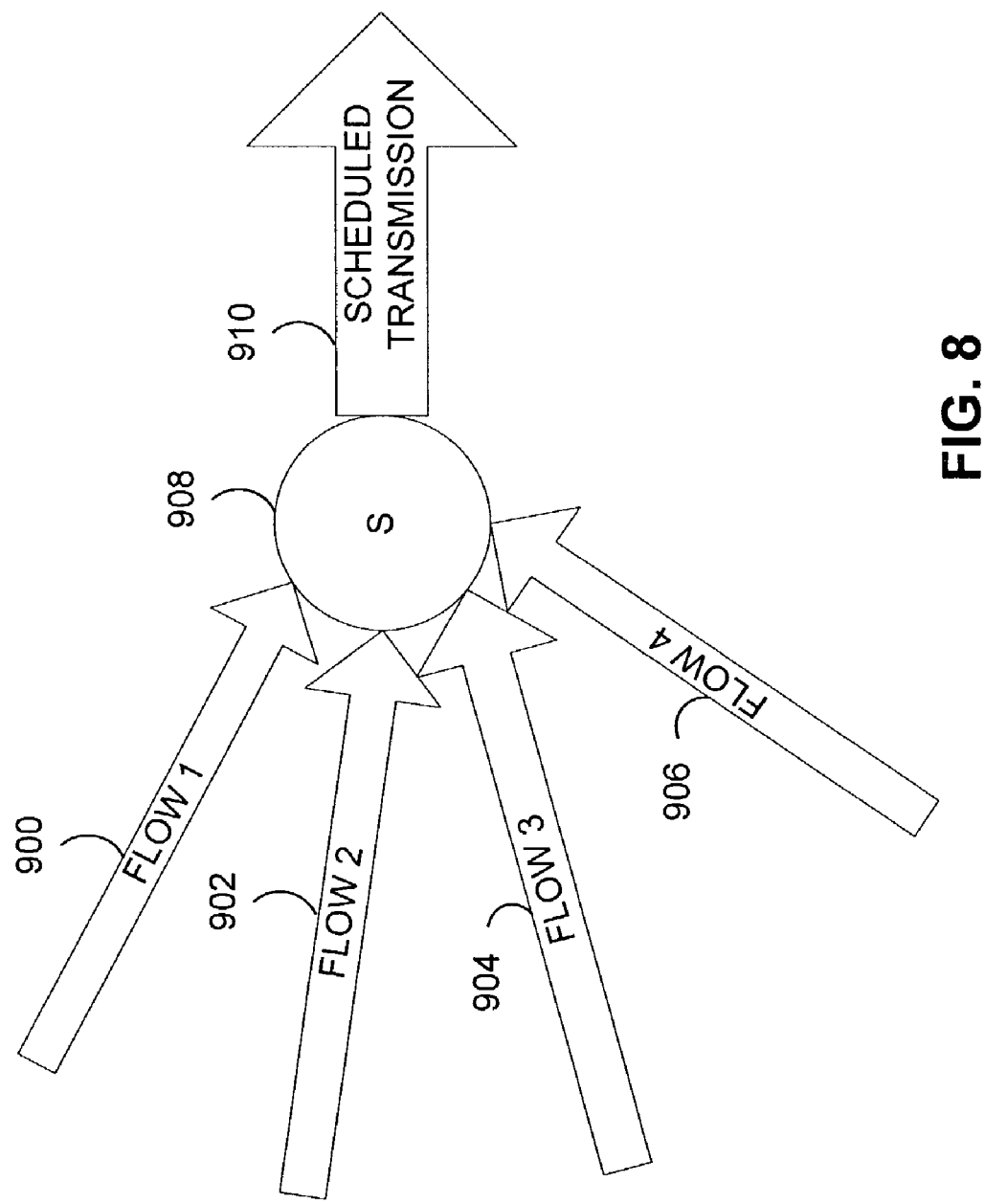
FIG. 8 is a flow diagram illustrating scheduling of application flows in a communication system.

FIG. 8 illustrates the processing of flows according to an adaptive weighted scheduling algorithm. Flows 900, 902, 904, and 906 are processed by a scheduling unit 908 labeled "S." The scheduling unit 908 applies an adaptive weighted scheduling algorithm wherein a QSG profile is used for each of the flows. The QSG profile identifies the variables that are used to calculate the adapted weight as detailed hereinbelow. The scheduling unit 908 then outputs a scheduled transmission to a selected AT.

The PF scheduling algorithm, referred to as the DRC/T algorithm, is described, wherein packets are classified into m queues, for example Q1, Q2, . . . , Qm. Let DRC[k,n] be the DRC requested by the mobile corresponding to flow k for slot n. The scheduler selects a flow with the highest value of the selection metric, Y[.,.], wherein $$Y[k,n+1]=DRC[k,n+1]/T_k[n+1], \forall k, \forall n. \quad (1)$$

Y[k,n+1] is the selection metric for queue Qk in slot (n+1) and $$T_k[n+1] = \left(1 - \frac{1}{t_c}\right)T_k[n] + \frac{1}{t_c}R[k,n], \quad (2)$$

$$\frac{1}{t_c} \leq 1, \text{ and}$$

$$0 < \frac{1}{t_c} \quad (3)$$

As used herein, $t_c$ is the time constant over which the average is computed.

Adaptive w*DRC/T Algorithm

In one embodiment, the adaptive weighted scheduling algorithm, referred to as the "adaptive w*DRC/T" algorithm, assigns an initial weight to each flow. Suppose the initial weight assigned to flow k is denoted by $w_k$ and the DRC requested by the AT corresponding to the flow k for slot n is DRC[k,n]. The adaptive w*DRC/T algorithm computes the following metric for each flow k in every slot n $$Y_k[n]=aw_k[n]*DRC_k[n]/T_k[n] \quad (4)$$

Here, throughput for flow k and slot n, $T_k[n]$, is as defined for DRC/T in the PF algorithm. As used in the adaptive weighted scheduling algorithm, $aw_k[n]$ is the adaptive weight for flow k in slot n. The adaptive w*DRC/T scheduling algorithm works in several modes, wherein the mode is defined by the QSG. The adaptive weight for flow k in slot n, $aw_k[n]$, is computed based upon the scheduler mode and a set of selected policies or mechanisms, described further hereinbelow. Note that Equation (4) is calculated for each flow, wherein the adaptive weights will be calculated according to a formulation specific to each flow. In other words, the scheduling algorithm considers the QoS profile of a given flow, and uses the QoS profile to form the calculations of the adaptive weight for the flow. In this way, different flows having different QoS requirements may have adaptive weights that are calculated differently. The scheduling algorithm next selects a flow with the maximum value of $Y_k[n]$ to serve in slot n.

The adaptive w*DRC/T scheduler works in the following modes:

Mode I [aw*DRC/T](r, d, j): designed for delay and jitter sensitive applications having tight requirements on delay and jitter bounds, and requiring some minimal rate.

Mode II [aw*DRC/T](r, d): used for applications with average delay and rate requirements.

Mode III [aw*DRC/T](r): used for applications having only rate requirements specified.

Mode IV [DRC/T]: used for flows not specifying any QoS plan but served by the DRC/T algorithm.

Based upon the QoS requirements, a particular mode of the adaptive w*DRC/T algorithm may be used for a given flow. Mode II may also be used on a flow to increase the throughput given to that flow by the scheduler. For example, Mode II may be used for FTP applications so as to potentially increase throughput for the corresponding application flows.

One example of grouping applications, i.e., QSG, is given below:

Group I: Voice over IP (VoIP)-like applications with tight requirements on delay bounds and delay variation. Note that often such applications also have rate requirement(s). Use scheduler Mode I.

Group II: Multimedia conferencing applications with tight requirements on delay bound, and delay variation. Even though some of these applications are adaptive, it is desirable to ensure a rate of service for consistent good quality. Use scheduler Mode I.

Group III: Video streaming applications with requirements on delay bound, rate and delay variation. Use scheduler Mode I.

Group IV: Web browsing applications with rate and (average) delay requirements—Use scheduler Mode II.

Group V: FTP applications with rate—Use scheduler Mode III. Alternatively, use scheduler Mode II with relaxed delay constraints.

Group VI: Best effort applications—Use PF algorithm, i.e., DRC/T algorithm, without adaptive weighting.

Note that database transactions, gaming and other applications may also be classified into suitable groups as per respective QoS requirements.

Figure 9:
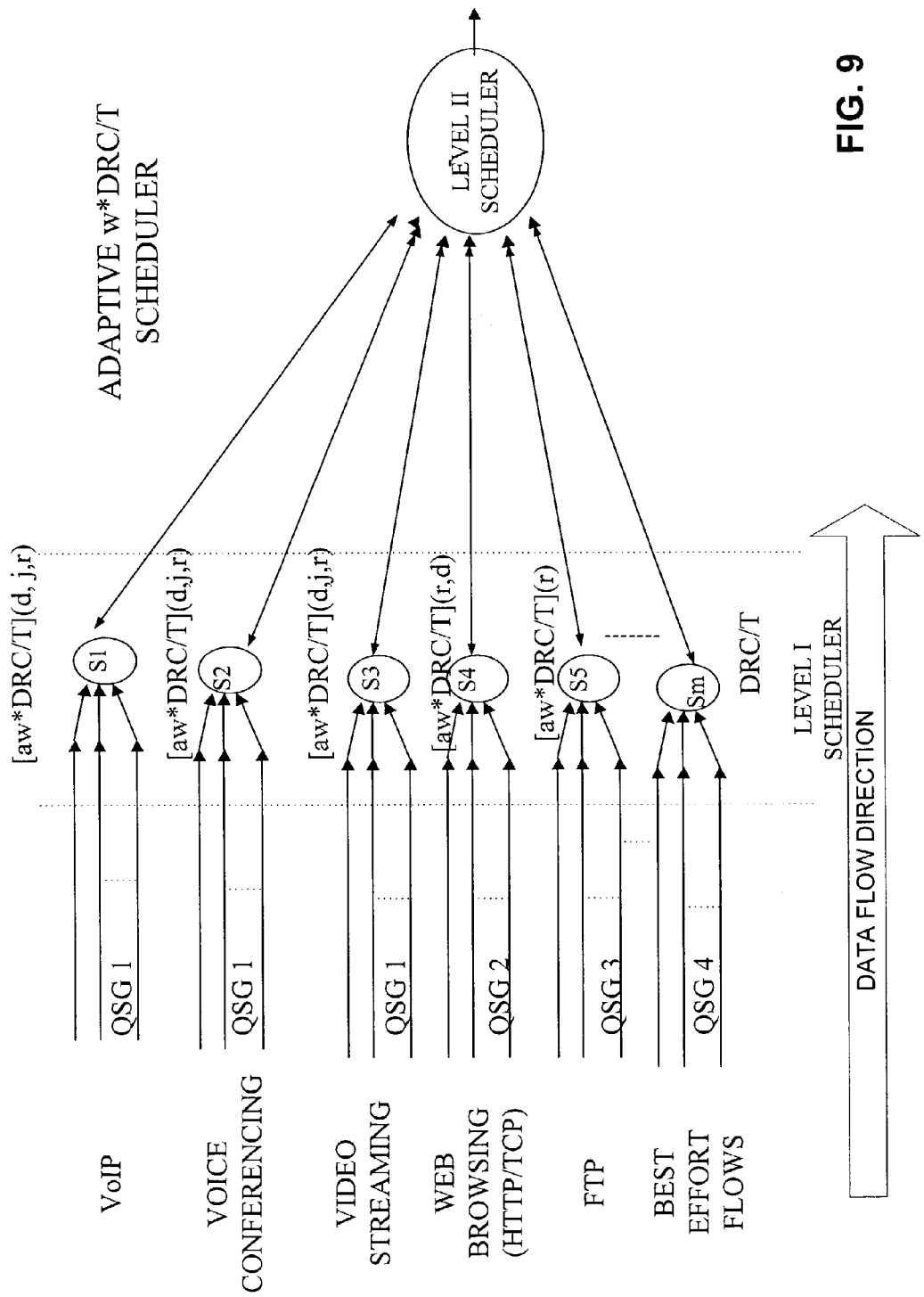
FIG. 9 is a flow diagram illustrating scheduling of application flows having different Quality of Service (QoS) requirements.

FIG. 9 illustrates an adaptive weighted scheduler having multiple levels, including but not limited to, level I and level II. The level I scheduler has multiple schedulers, S1, S2, S3, . . . Sm, wherein m refers to the total number of Groups. Each level I scheduler in FIG. 9 runs a particular operation mode of the adaptive w*DRC/T scheduling algorithm and selects a flow from that group. First, the Level I scheduler calculates part of Y, specifically, the throughput, T, and the rate compensation factor, α. Next, the level II scheduler considers flows and provides input to level I scheduler sufficient for complete calculation of the selection metric Y by the level I scheduler. Once Y is completely computed for all pending flows, the level I scheduler evaluates the Y values and selects a flow with the highest value of Y. Each level I scheduler evaluates a group of flows having similar QoS requirements. The selected flow of each level I scheduler is then provided to the level II scheduler for comparison with flows from other groups. The level II scheduler considers one selected flow per group and selects the one having the highest value of the metric (aw*DRC/T) or Y. The process is repeated for every slot when the scheduler needs to select a flow to serve. Alternate embodiments may use a single level scheduler, or may use more levels than illustrated in FIG. 9. Alternate embodiments may include a different number of level I schedulers, wherein the level I schedulers correspond to flow organizations.

Generally, the adaptive weight calculation is given as a function of several parameters and is given as:

$$a=f(\Phi, \gamma, \alpha, \beta, \delta). \quad (5)$$

A delay compensation function is identified as Φ. A waiting time parameter is identified as γ. A rate compensation function is identified as α. A DRC compensation function is identified as β. An enhanced jitter compensation factor is identified as δ. Note that not all of the parameters have substantive values for all multimedia services. For example, when the only QoS requirement for a given flow is a specified data rate, then the variable α will be specified, (the rate parameter will have a substantive value) and all other parameters will be set equal to the value 1. In this case, only the rate parameter will be included in the adaptive weight calculation. In one embodiment, the adaptive weight is calculated as:

$$a = \Phi * \gamma * \alpha * \beta * \delta, \quad (6)$$

wherein the operator is multiplication. The following discussion provides details of the various compensation terms that may be included in the adaptive weight calculation.

For Mode I applications, the QoS profile specifies all of the parameters indicated in Equation (6). The adaptive weight calculations consider delay compensation due to delay threshold violations, delay compensation due to waiting time threshold violations, rate compensation due to rate violation, and enhanced jitter compensation due to enhanced jitter threshold violation. The concept boosts weights of a flow that is violating the specified QoS requirements. Triggered on violation of QoS requirement(s), such flow is given credit. The credit is implemented by multiplying the weight of the flow by a suitable value for a delay compensation function. This is further multiplied by rate compensation and enhanced jitter compensation.

In contrast, when a flow appears to receive excess service, such flow may be penalized. A flow may be penalized in any of a variety of ways. According to one method, the flow may be directly penalized by reducing the flow weight. According to another method, the flow may be indirectly penalized by maintaining that flow weight while increasing the weights of other users who are lagging (i.e., those flows that have not achieved a required QoS).

There are a variety of mechanisms to compute a delay compensation to account for violation(s) of a delay threshold. Suppose a delay threshold for flow k is denoted by $dth\_\phi_k$ and the delay compensation due to a delay threshold violation for flow k in slot n is denoted by $\phi_k[n]$. To compute the delay compensation, $\phi_k[n]$, consider the packets in all three queues (i.e., Tx, RTx and ARO) for each flow.

For each flow, a max and a min threshold on $\phi$ is also specified so as to assure a flow doesn't consume several slots consecutively and starve other flows. This is also designed to ensure that a flow's delay compensation term due to delay threshold violation is at least as good as the min threshold value. Let $\phi_{thres,min,k}$ and $\phi_{thres,max,k}$ be the minimum and maximum threshold values that are specified for each flow k. This results (for all k and all n) in:

$$\phi_{thres,min,k} \leq \phi_k[n] \leq \phi_{thres,max,k}, \forall k, \forall n. \quad (7)$$

The following definitions will be used to develop the calculation of delay compensation:

D[n]: defines a set of flows experiencing a delay threshold violation at the beginning of slot n (i.e., each such flow has at least one packet in at the beginning of slot n, which has crossed that flow's delay threshold.)

defpkts$_k$[n]: defines "deficit" packets for flow k at the beginning of slot n. The deficit packet is a packet not yet transmitted in the flow, and defpkts is specifically defined as the number of equal-size (MAC) packets that have stayed in the BTS longer than the delay threshold for flow k.

required_rate$_k$: defines the required rate of flow k.

ndekkts$_k$: defines the number of normalized deficit packets for flow k, specifically defined as:

$$ndefpkts_k = \frac{defpkts_k}{required\_rate_k} \quad (8)$$

Note that packets in the BTS, BSC and PDSN may be of unequal sizes and therefore, it is beneficial to count the number of deficit bits here instead of packets.

If the HOL packet of a flow has been in the BTS queue for a time period larger than a pre-specified threshold, the flow may be compensated using the following mechanisms. A waiting time threshold used for this purpose should be larger than or equal to the threshold used for computing $\phi$. For flow k the waiting time threshold is denoted by $dth\_\gamma_k$, wherein the waiting time threshold is constrained by $dth\_\gamma_k \geq dth\_\phi_k$, $\forall k$. To select the HOL packet of a flow, first consider HOL packets from the Tx, RTx and ARQ queues of a flow and select one based on latency at the BTS, i.e., select the one waiting in the BTS for the longest period of time. Let $\gamma_k[n]$ be the waiting time compensation for flow k at the beginning of slot n, and $S_k[n]$ be the time spent in the BTS queue by the HOL packet of flow k at the beginning of slot n. For each flow k, a minimum threshold, $S_{thres,min,k}$ and a max threshold $S_{thres,max,k}$ are also specified, satisfying $S_{thres,min,k} \leq S_k[n] \leq S_{thres,max,k}$, $\forall k \forall n$.

According to one embodiment, a delay compensation is applied when a flow is experiencing a delay threshold violation or a waiting time threshold violation. The mechanism applies the DRC data rate request to the adaptive weight. Let $\beta_k[n]$ be the DRC adjustment function for flow k in slot n. A minimum threshold, $\beta_{min,thres,k}$, and a maximum threshold, $\beta_{max,thres,k}$, are specified for each flow k and satisfying $\beta_{min,thres,k} \leq \beta_k[n] \leq \beta_{max,thres,k}$.

While the above-described compensation mechanisms help to reduce delay variation of a flow, for some applications, such as video/audio conferencing, it may be desirable to include delay variation (jitter) control more effectively and reduce the delay variation even further. The following mechanisms provide effective delay variation control by reducing delay variation between consecutive packets of a flow. Flows with larger IP packet sizes benefit more from this compensation mechanism.

Suppose at(k,j) be the arrival time of the IP packet j of flow k at the ingress of BSC. Let dt(k,j) be the departure time of this IP packet from the BTS, i.e., by this time all segments of this IP packet have been transmitted by the forward link scheduler at the BTS. Let pend$_{k,j}$[n] be the total length in bytes of the IP packet j of flow k at the BTS and BSC. Also, assume that $dv_{k,target}$ is the target delay variation (jitter) between consecutive IP packets for flow k and $dv_{k,thres}$ is a pre-specified enhanced jitter threshold for this flow such that $dv_{k,thres} < dv_{k,target}$. In one embodiment, the algorithm then triggers the enhanced delay variation compensation mechanisms for flow k when delay variation between consecutive IP packets goes above $dv_{k,thres}$.

Figure 10:
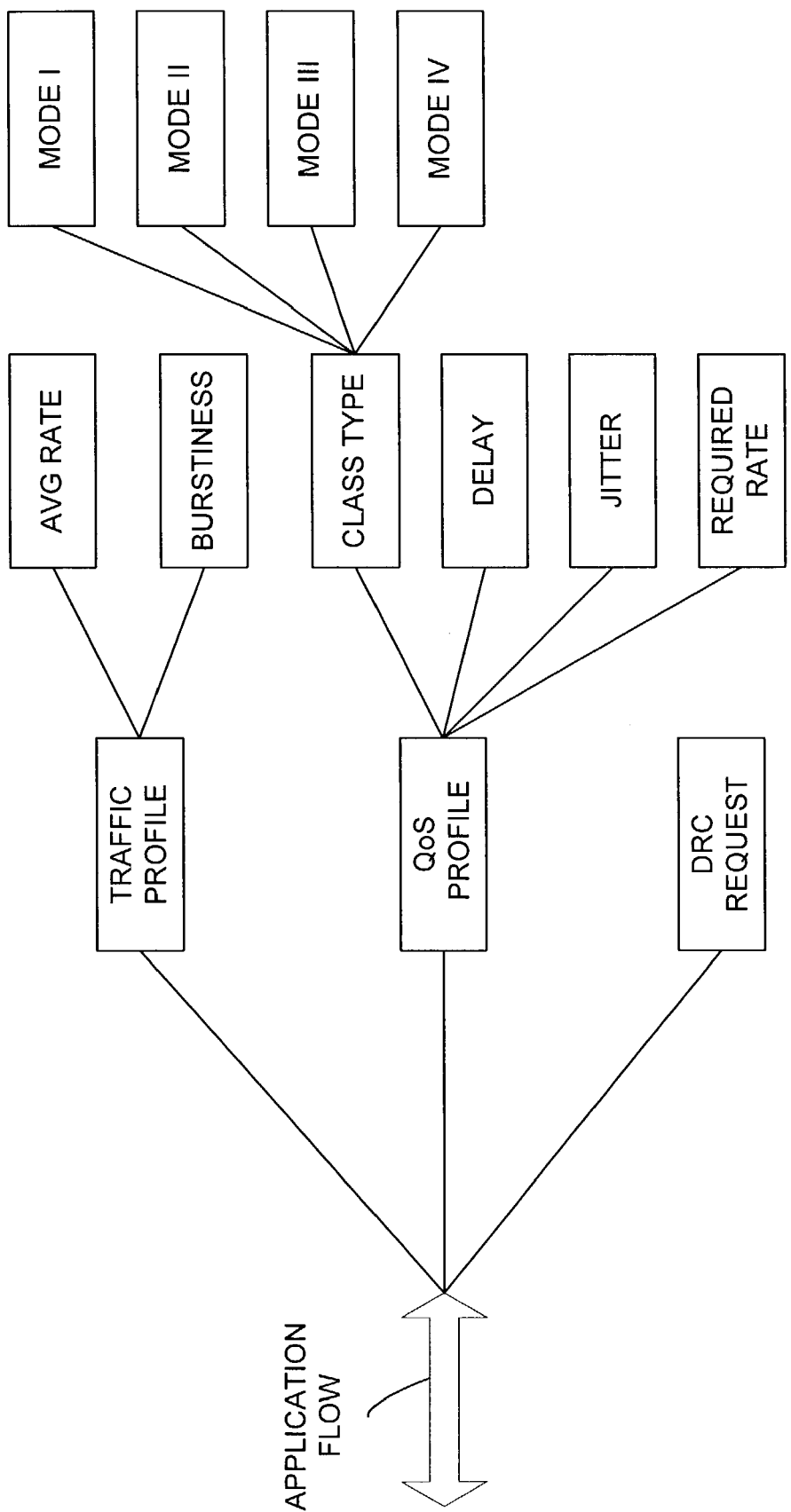
FIG. 10 is an architectural diagram illustrating the definition of each application flow consistent with a scheduling algorithm according to one embodiment.

FIG. 10 provides an architectural diagram corresponding to one embodiment. Each application flow is described by a traffic profile, a QoS profile, and a DRC request, i.e., requested data rate. Each traffic profile includes a measure of burstiness and an average data rate. Each QoS profile includes a class type and the parameter bounds. The class type may be one of Mode I, Mode II, Mode III, or Mode IV. The bounds specify bounds for delay, jitter, and the required data rate. Some applications such as web browsing, may specify average delay instead of delay bound. Delay thresholds for mode I are chosen to be less than jitter bound; and for mode II, delay threshold is chosen to be less than the average delay. An enhanced jitter threshold is chosen to be less than the jitter bound. Alternate embodiments may apply more or less information to each application flow, wherein the QoS requirements may be specific to the network and configuration.

FIG. 11 is a table specifying the QoS requirements and QoS parameters for each class type. As indicated, Mode I corresponds to the strictest requirements, while Mode IV corresponds to a Best Effort, wherein no QoS requirements are specified. Alternate embodiments may include other QoS requirements, QoS parameters and/or modes.

Figure 12A:
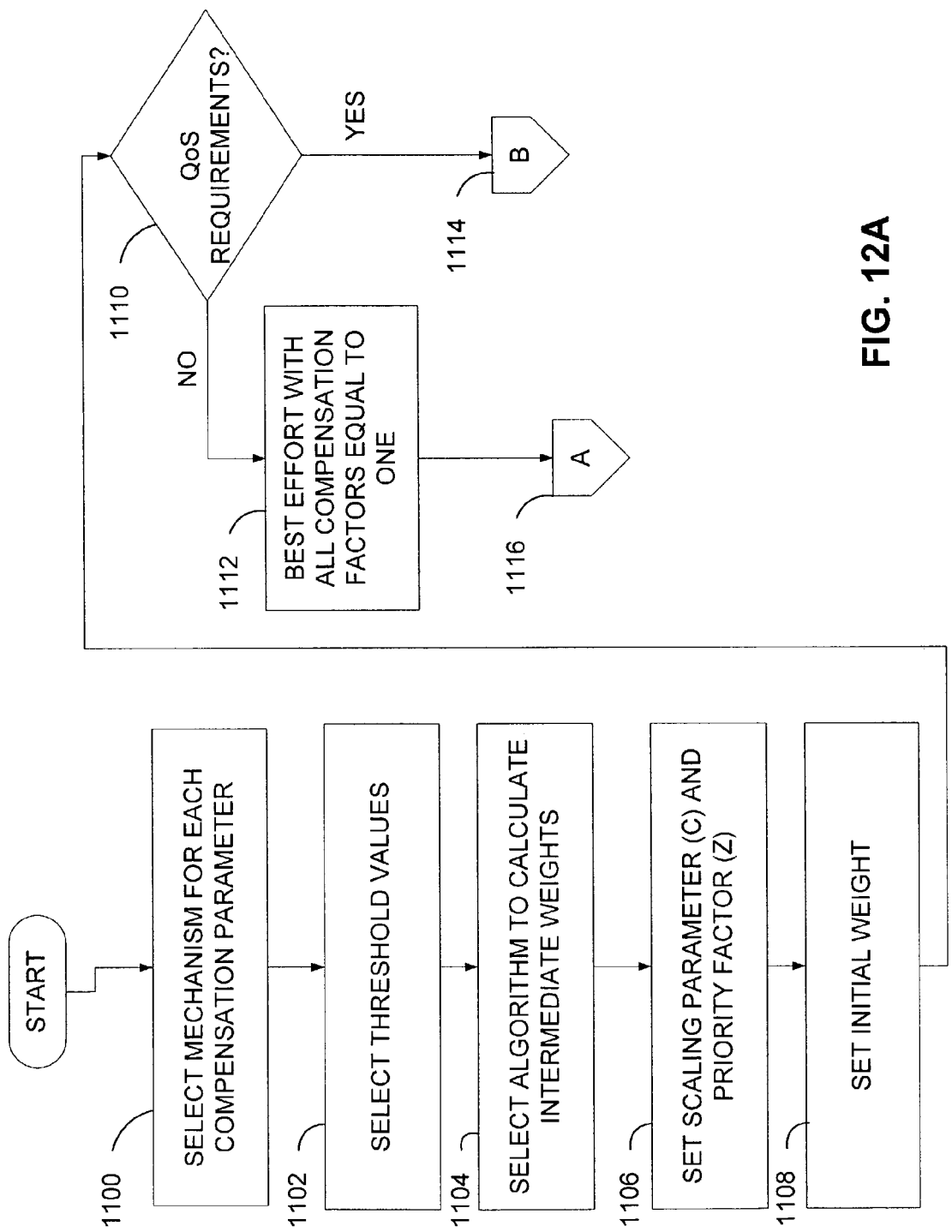
FIG. 12A illustrates a portion of a scheduling algorithm according to one embodiment, including initialization of an application flow.

FIGS. 12A through 12E illustrate processing of an application flow and scheduling of that application flow as part of the active application flows. FIG. 12A is a flow diagram illustrating the initialization and set up for an individual application flow. The process starts at step 1100 to select the mechanisms used for each compensation parameter. The compensation parameters include, but are not limited to: delay ($\Phi$); pending time ($\gamma$); DRC ($\beta$); jitter ($\delta$); and rate ($\alpha$). At step 1102 the threshold values are selected for applicable compensation parameters. Note that compensation parameters may include any parameter of the application flow of significance to the AN. The algorithm for calculating intermediate weights at step 1102, wherein the intermediate weights are used in calculating the adaptive weights used for scheduling. At step 1106 the scaling parameter (C) and the priority factor (Z), both used in calculating adaptive weights, are set. At step 1108 the initial weight for this application flow is set. At step 1110 the QoS requirements of the application flow are evaluated. If there are no specified QoS requirements, other than the rate identified by the DRC request, the default condition is used. The default condition is referred to as "Best Effort" as described hereinabove. In this case, the default processing sets all of the compensation factors used for this application flow equal to one. For the present embodiment, in this case the calculation of Equation (6) uses a multiplication operator and, therefore, setting factors to one effectively ignores those factors, i.e., those factors do not impact the weighting. Note alternate embodiments may implement other mechanisms and functions, and, therefore, use other mechanisms to ignore specific or all compensation factors.

The Best Effort processing continues at steps 1112 and 1116. The resultant scheduling factor calculation is consistent with the proportional fair calculation. If the application flow has QoS requirements, processing continues to step 1114. Steps 1114 and 1116 indicate processing continued in subsequent figures.

Figure 12B:
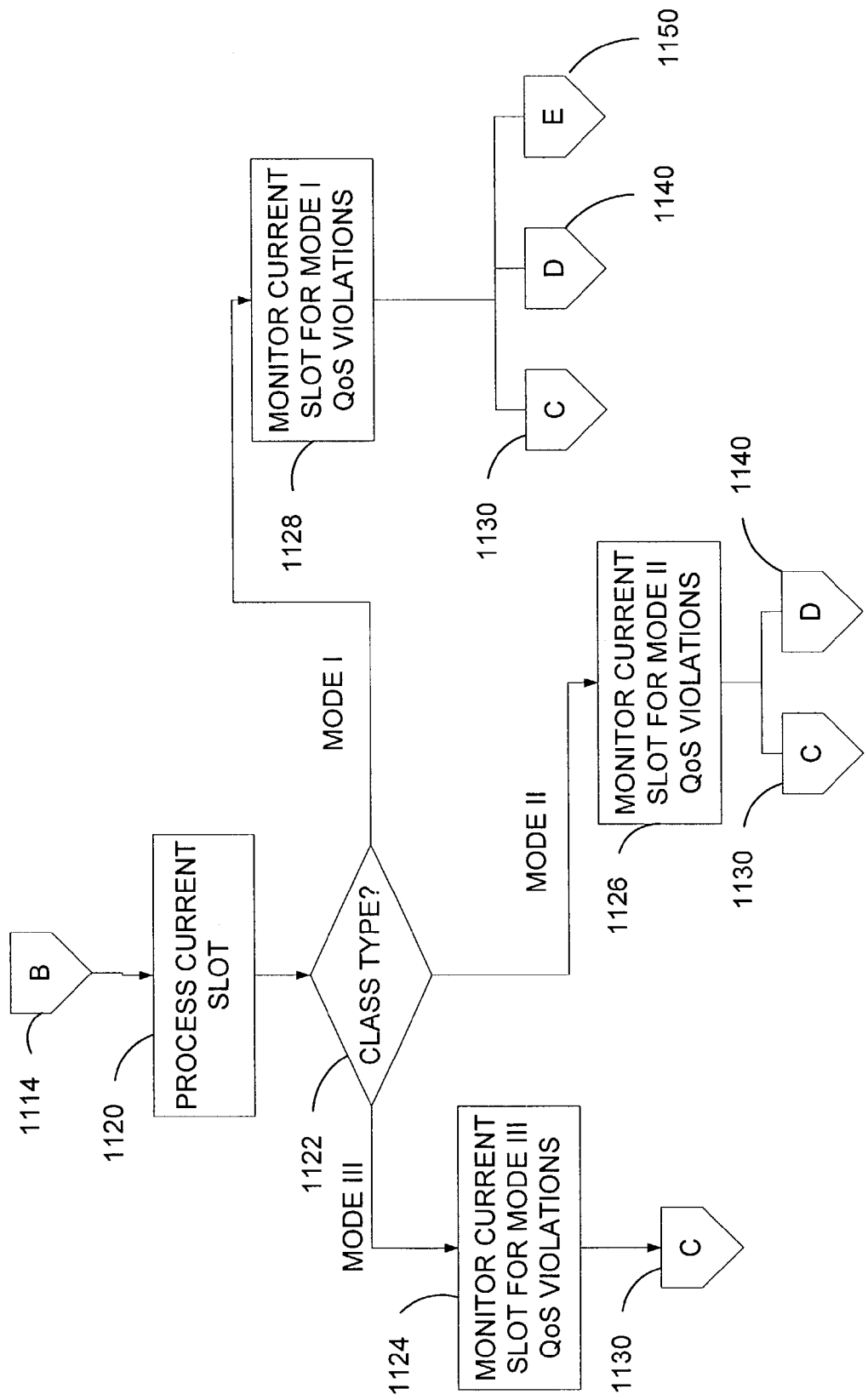
FIG. 12B illustrates a portion of a scheduling algorithm according to one embodiment, including processing of an application flow as a function of class type.

FIG. 12B continues the processing of FIG. 12A from step 1114. At step 1120 processing of the current slot starts. At step 1122 a decision is made as the class type of the application flow. Mode I is processed at step 1128, Mode II is processed at step 1126, and Mode III is processed at step 1124. Mode I QoS parameters are monitored at step 1128; Mode II QoS parameters are monitored at step 1126; and Mode III QoS parameters are monitored at step 1124. QoS violation checks are then made at steps 1130, 1140, and 1150, further detailed in FIGS. 12C and 12D.

Figure 12C:
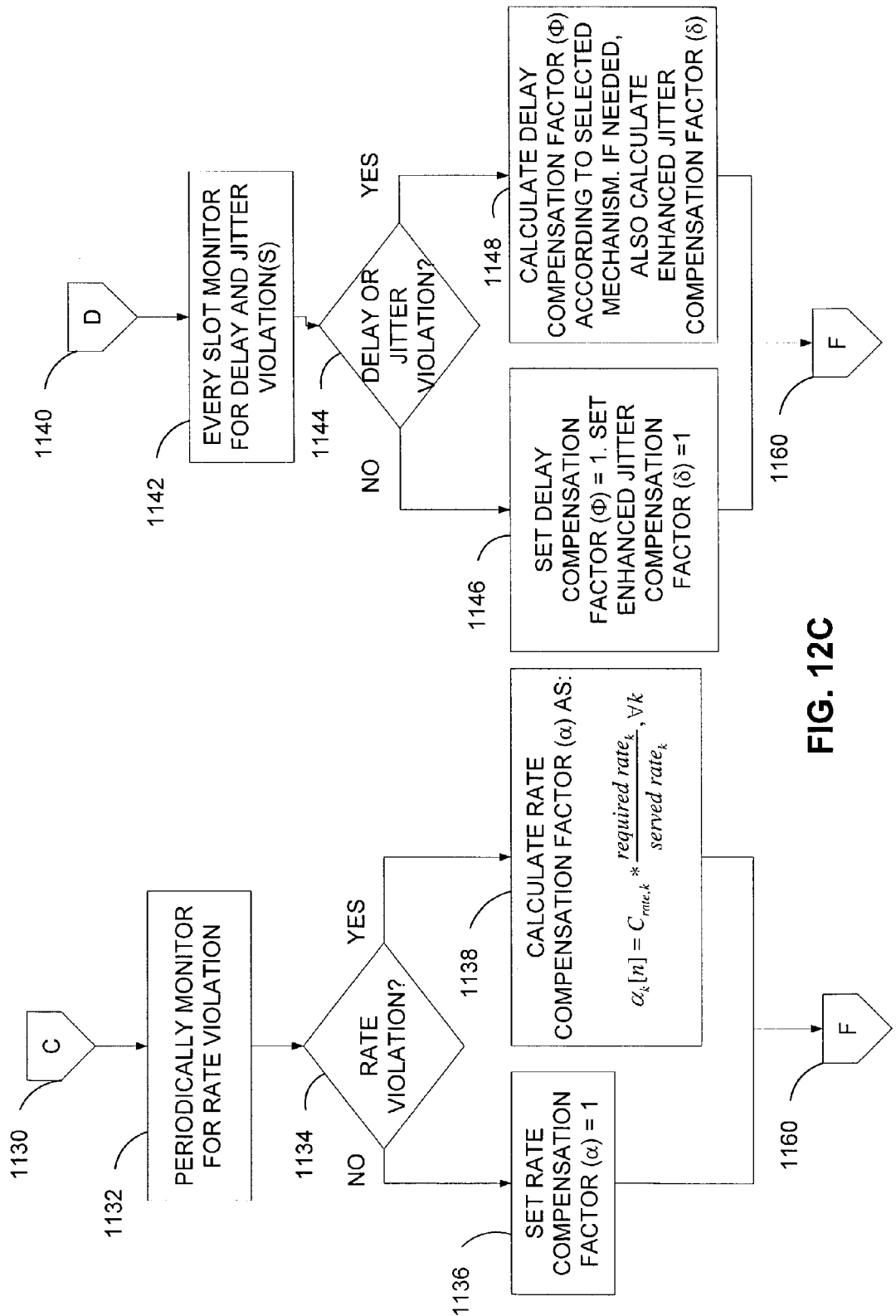
FIG. 12C illustrates a portion of a scheduling algorithm according to one embodiment, including processing of a Mode II application flow and processing of a Mode III application flow.

Processing of the application flow continues at step 1130 of FIG. 12C for a Mode I, II or III application. At step 1132, the algorithm periodically monitors for rate violations. Note that the rate compensation calculation is performed periodically and used for multiple slots thereafter. If a rate violation is detected at step 1134, processing continues to step 1138 to calculate the rate compensation factor ($\alpha$). Else, the rate compensation factor ($\alpha$) is set equal to one at step 1136. Processing then continues to step 1160 further detailed in FIG. 12E.

Processing of the application flow continues at step 1140 of FIG. 12C for a Mode I or II application. At step 1142 the method monitors for delay and jitter violations at every slot. If a delay and/or jitter violation is detected at step 1144, processing continues to step 1148 to calculate the delay compensation factor ($\Phi$), according to the mechanism selected at initialization. For a Mode I flow which has requested enhanced jitter compensation, then the enhanced jitter compensation factor ($\delta$) is also computed. For Mode I flows which have not requested enhanced jitter compensation and for mode II flows, $\delta$ is set equal to 1. Else, the delay compensation factor ($\Phi$) is set equal to one at step 1146 and $\delta$ is set equal to 1. Processing then continues to step 1160 further detailed in FIG. 12E. Note that for a Mode I or II application flow, violation checks may be done in tandem or in parallel. In other words, rate violation and delay/jitter violation checks may be performed successively in time, or concurrently.

Figure 12D:
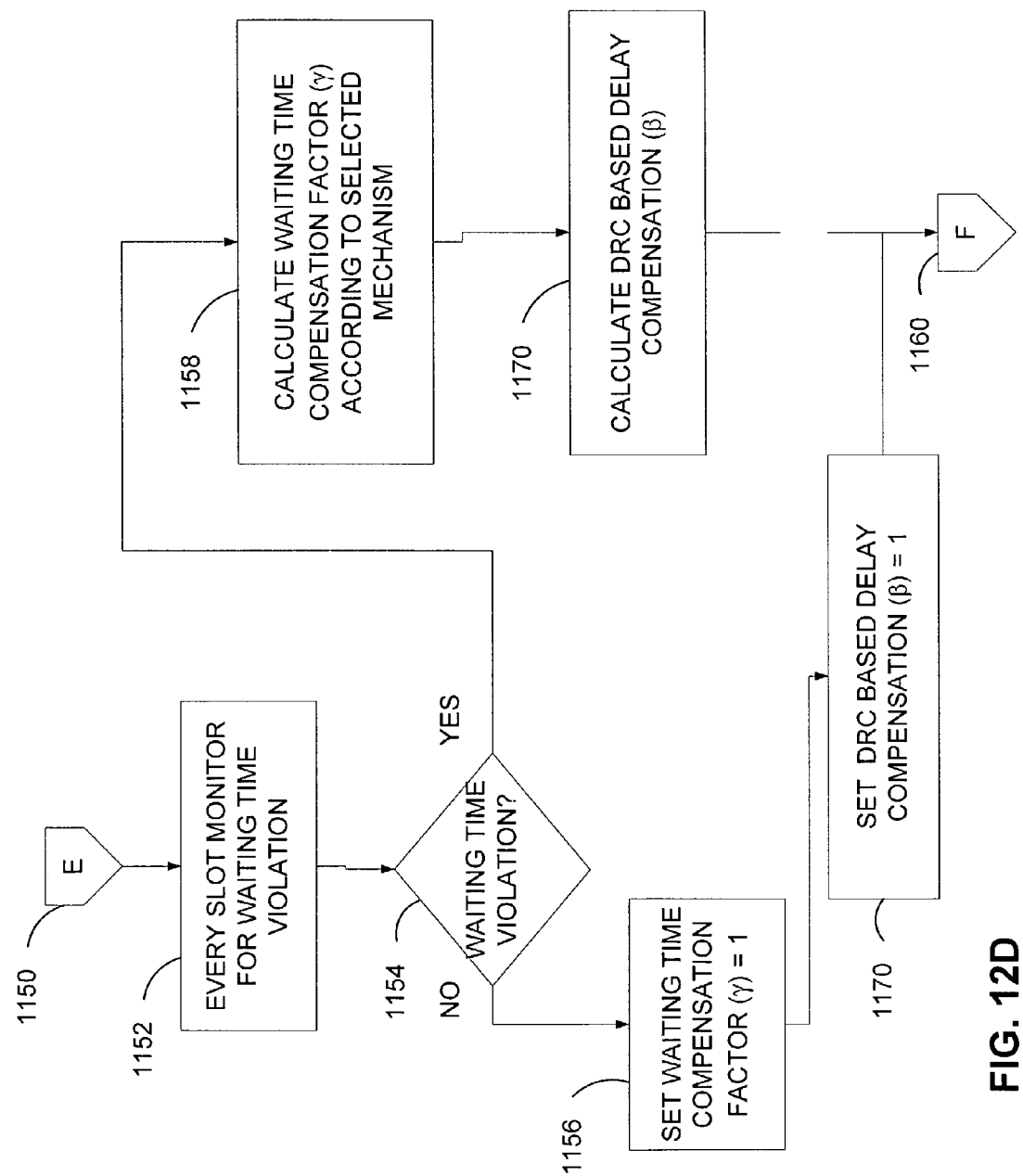
FIG. 12D illustrates a portion of a scheduling algorithm according to one embodiment, including processing of a Mode I application flow.

Processing of the application flow continues at step 1150 of FIG. 12D for a Mode I application. At step 1152 the method monitors for waiting time violations. If a waiting time violation is detected at step 1154, processing continues to step 1158 to calculate the waiting time compensation factor ($\gamma$), according to the mechanism selected at initialization. Else, the waiting time compensation factor ($\gamma$) is set equal to one at step 1156. Processing then continues to step 1160 further detailed in FIG. 12E. Note that for a Mode I application flow, violation checks may be done in tandem or in parallel. In other words, rate violation, delay/jitter violation, and waiting time checks may be performed successively in time, or concurrently.

Figure 12E:
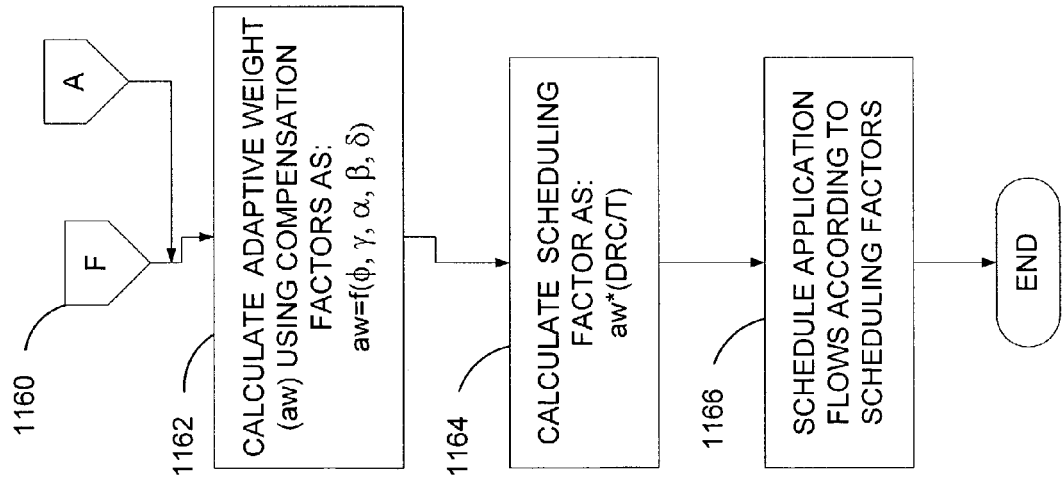
FIG. 12E illustrates a portion of a scheduling algorithm according to one embodiment, including adaptive weighting and scheduling based thereon.

FIG. 12E illustrates processing from step 1160 and step 1116. At step 1162 calculates an adaptive weight for the application flow as a function of the QoS parameters and compensation factors, given as:

$$aw = f(\Phi, \gamma, \alpha, \beta, \delta) \quad (9)$$

At step 1164 the scheduling factor or scheduling metric, is calculated as:

$$\text{Scheduling Factor} = aw*(DRC)/T \quad (10)$$

The scheduling algorithm then schedules application flows according to the scheduling factors calculated for each of the active application flows.

Figure 13:
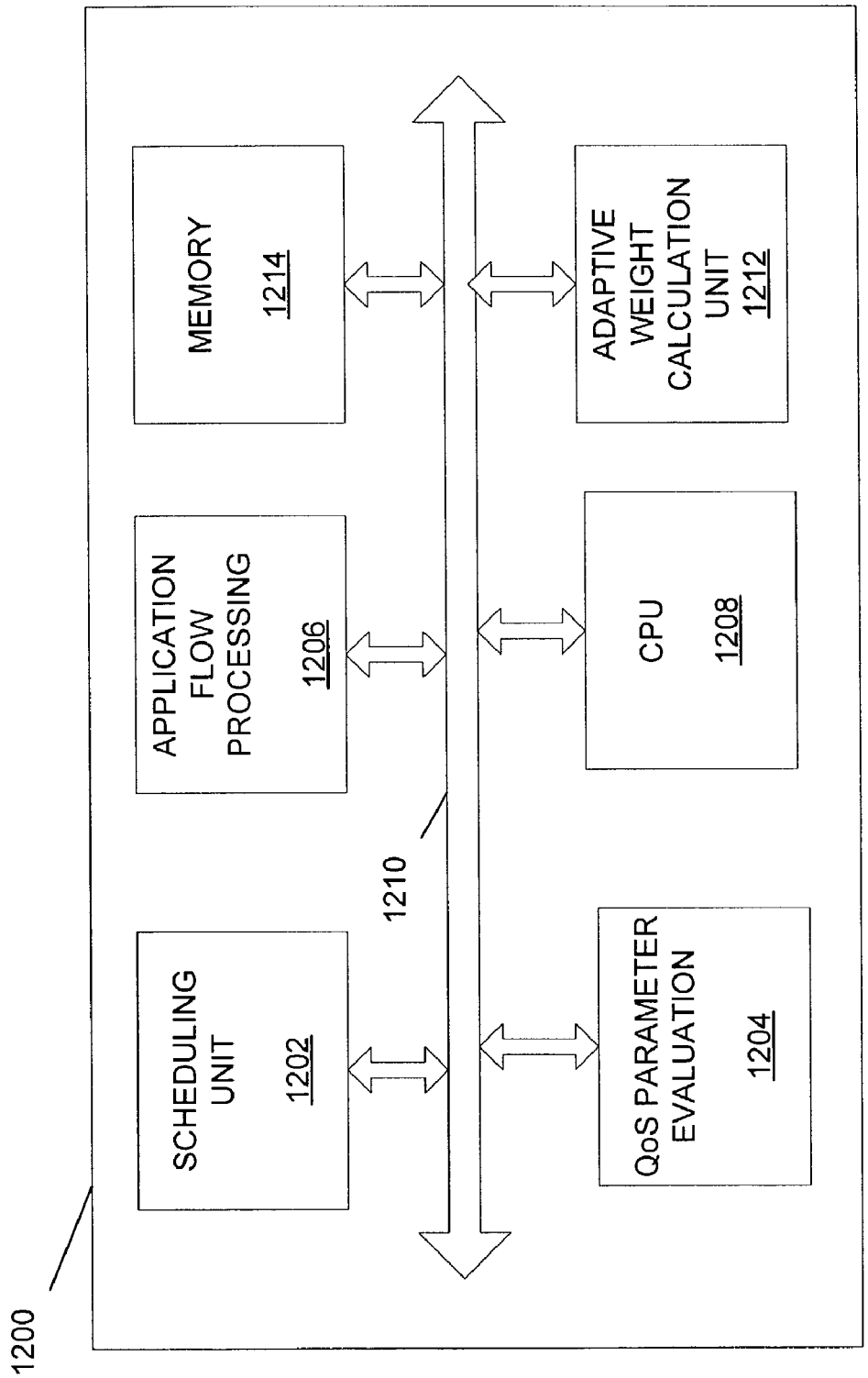
FIG. 13 illustrates a Base Station Transceiver System (BTS) for implementing an algorithm for scheduling application flows using an adaptive weighted algorithm in a wireless communication system.

FIG. 13 illustrates a BTS 1200 adapted for applying a scheduling algorithm according to one embodiment. The BTS 1200 includes a scheduling unit 1202, application flow processing unit 1206, QoS parameter evaluation 1204, adaptive weight calculation unit 1212, and CPU 1208, each coupled to a communication bus 1210. The scheduling unit 1202 performs the scheduling by preparing scheduling factors for each application flow, and then selecting among the various active application flows according to the scheduling factors. The policy and goals of a given system are incorporated into the scheduling algorithm. QoS parameter evaluation 1204 monitors for QoS violations, and provides information to scheduling unit 1202 and weight calculation unit 1212. Application flow processing performs processing, which includes, but is not limited to, directing packets to the destination AT, receiving from the destination AT QoS information used for scheduling, and providing such information to the QoS parameter evaluation 1204. The BTS 1200 also includes a memory 1214 for storing intermediate information, and maintaining data used for calculating averages, flow queues, etc. Violation checks are done at the BTS. One embodiment keeps counting the number of bytes sent out for each flow and uses that for a rate violation check. Each packet is time stamped when it arrives at the BSC. The time keeps incrementing as long as the packet remains in the AN, BSC or BTS. The BTS uses this time for detection of threshold violations and then computes delay, waiting time or enhanced jitter compensation functions according to the flow.

Admission Control

Admission control refers to the decision process in allowing entry to a user requesting a data service. When a new user requests a data service, such as an application having QoS requirements, the AN determines if there are available resources to support such usage. The admission process considers the requested application, the current usage, as well as QoS and network statistics. If the AN determines the new user may be supported, then the corresponding application flow is admitted. Else, if there are not currently resources available, the application flow is denied or placed in a queue to await a change in status. Note that a new user may actually be a user with a currently active application flow that is requesting an additional service, i.e., additional application flow.

In addition to and as a part of admission control, a process of preemption may be implemented for terminating active application flows, wherein current operating conditions are evaluated to make preemption decisions. In this case, each of the current flows is evaluated for QoS violations, as well as data rate.

This section presents an adaptive per-sector admission control algorithm. Such admission control algorithm decides whether or not to admit (or preempt) a flow in a given wireless multimedia network. It is therefore possible to determine the number of flows (of each class) which may be allowed in a given network. Embodiments of an admission control algorithm presented herein include mechanisms to perform both inter-user and intra-user QoS monitoring, and then applying this information to admission and/or preemption decisions. Such embodiments are designed to ensure per-flow and per-user QoS requirements are satisfied for the admitted flows and users. Such mechanisms facilitate coordination of an admission control algorithm and a hierarchical scheduling algorithm.

Scheduling and admission control are part of the Forward Link (FL) QoS management in a wireless networks, wherein such management is a complex problem. QoS management is a significant consideration in design and operation of a communication network. Application flows are classified according to criteria as defined by the system. In one embodiment, the classification is according to QoS requirements. First, admission control determines a number of flows that may be admitted under current operating conditions. The number of flows is then divided into a number of flows per each class. The system then operates to satisfy the QoS requirements for each admitted flow. Note the number of flows may change dynamically over time and with the type of application. For example, at a first time, the Access Network (AN) may support a first scenario wherein each type of application is allowed a specific number of flows. At a second time, the AN may support a second scenario wherein at least one of the types of application is be allowed a different number of flows.

A scheduler (i.e., scheduling algorithm) implements a fairness strategy among the admitted flows. The scheduler further attempts to perform a graceful recovery of flows having QoS violations. An operator's revenues and profits are dependent on the effectiveness of the scheduling algorithm used. More efficient and feature-rich algorithms provide opportunities to increase these profits.

With respect to admission control, one embodiment implements a subscription factor based method. Note subscription based methods are often used in admission control algorithms for wireline networks. In a wireless network, the channel conditions of each user keep varying and hence the forward link capacity as seen by the BTS scheduler also keeps varying. The wireline subscription factor based algorithm assumes fixed link capacity and thus is not directly applicable in wireless networks.

For wireless networks, one embodiment provides an Adaptive Subscription Factor (ASF) based admission control algorithm for FL management, wherein the network supports multiple application flows having QoS requirements. The ASF admission control in a wireless network dynamically updates the subscription factor by monitoring the QoS statistics and network statistics. Various mechanisms may be used to perform the updating functions. It is therefore possible to take corrective action using the adaptive subscription factor. Additionally, the ASF is used to implement a preemption method.

The ASF, AS(t), is calculated at each time t. The process determines minimum threshold, $AS_{min\_prespecified}$, and a maximum threshold, $AS_{max\_prespecified}$, for AS(t) such that $1 < AS_{min\_prespecified} \leq AS(t) \leq AS_{min\_prespecified} < \infty$, $\forall t$. Initially, a value, $S_{initial}$, is assigned to the ASF, such that $AS(O) = S_{initial}$.

Figure 14:
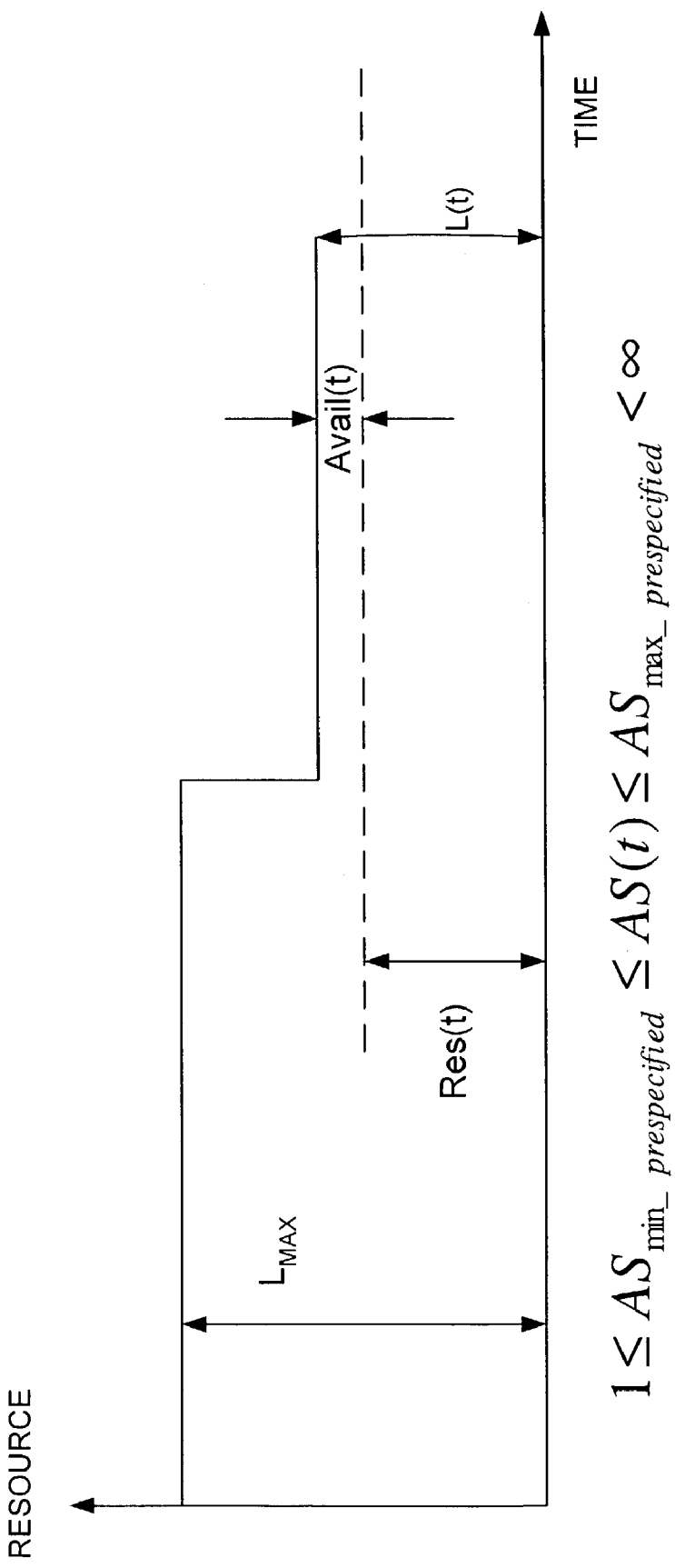
FIG. 14 is a timing diagram plotting maximum resources for allocation, such as data rate (LMAX), reserved resources (Res(t)), and available resources (Avail(t)) as a function of time.
Figure 15:
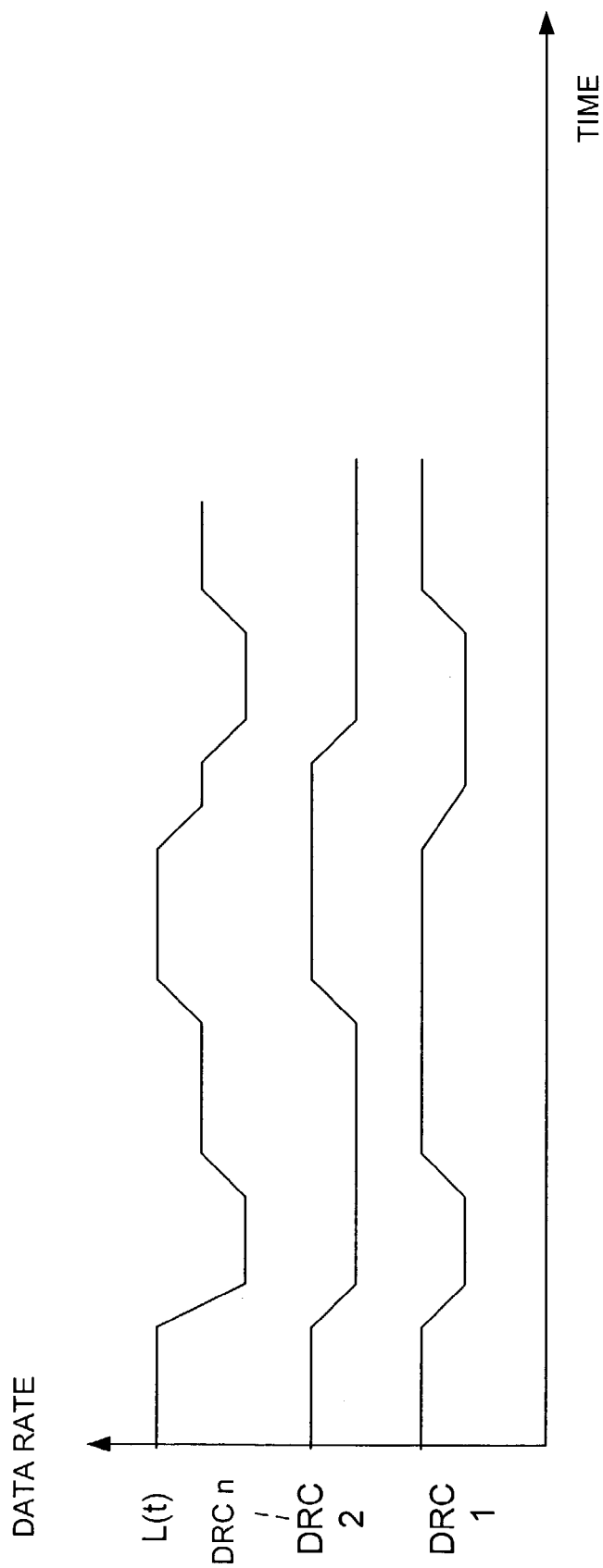
FIG. 15 is a timing diagram plotting the data request received from users in a High Rate Packet Data type system, and estimate capacity, L(t), as a function of time, to reserve at time t.

FIG. 14 is a timing diagram plotting the maximum data rate, the reserved bandwidth, and the available bandwidth as a function of time. The maximum rate at which the BTS may transmit data on forward link ($L_{max}$) provides an upper bound for the allocation of resources. Active application flows are evaluated to determine the reserved bandwidth, Res(t). Using QoS violation and network load related statistics, the calculation of an adaptive subscription factor and an estimate of forward link capacity, L(t), desired to be reserved at time t is performed. Note it is possible that $L(t) \leq Res(t)$. For example, suppose admitted flows were experiencing very good channel conditions at the time of their admission. Now, channel conditions of several flows become bad and some flows are not achieving associated QoS guarantees. In this case, the system may desire to become more conservative in admitting more flows and set Avail(t)=0. On the other hand, if L(t)>Res(t), the system may set Avail(t)=L(t)−Res(t)., A value L(t) is then an estimate of forward link capacity desired to be reserved at time t based upon previous QoS violation and network load related statistics, and is calculated as a function of $L_{max}$ and ASF as:

$$L(t) = \frac{L_{max}}{AS(t)}, \forall t, \quad (11)$$

with the constraint:

$$L(t) \leq \frac{L_{max}}{AS_{min\_prespecified}} < L_{max} \text{ and} \quad (12)$$

$$L(t) \geq \frac{L_{max}}{AS_{max\_prespecified}} > 0. \quad (13)$$

The available bandwidth, Avail(t), is computed as:

$$Avail(t) = maximum(L(t) - Res(t), 0) \quad (14)$$

The various measures of resources as illustrated in FIG. 14 are determined by the Data Rate Control (DRC) data requests received from the users. Each user transmits a DRC data request on the Reverse Link. In a cdma2000 1xEV-DO or other HRPD type system, the user transmits the DRC data request on each slot of the RL transmission. As illustrated, the data requests from a user 1 (DRC1) and a user 2 (DRC2)

change over time. The data requests, and required QoS determine the reserved bandwidth (Res). Note the relationship between the DRC values and Res is provided as an illustration. Alternate embodiments and scenarios may incur a different relationship.

Each application flow has a specified traffic profile in terms of average rate and burstiness, wherein flow $f_k$'s traffic profile is given by $(\sigma_k, r_k)$. Here, $r_k$ is the average required rate for flow $f_k$ and $\sigma_k$ is a measure of burstiness, wherein the requested rate for flow $f_k$ is given as $\text{req\_rate}(f_k)=r_k$.

According to one embodiment, admission control evaluates flow $f_k$ for admission. Admission control first applies an observed DRC for the user, $u(f_k)$, corresponding to flow $f_k$, to satisfy the required rate, wherein the observed DRC is less than or equal to an average DRC data request for that user, as:

$$\text{req\_rate}(f_k) \leq Avg(drc(u(f_k))). \tag{15}$$

Computation of the ASF, AS(t), is then performed and used to compute Avail(t) as:

$$\text{Avail}(t) = \text{maximum}\left(\frac{L_{\max}}{AS(t)} - Res(t), 0\right) \tag{16}$$

Finally, the admission decision for flow $f_k$ at time t considers:

$$\text{req\_rate}(f_k) \leq \text{Avail}(t). \tag{17}$$

If the flow $f_k$ is admitted, the resource measures, as illustrated in FIG. 14, are updated as:

$$Res(t) = Res(t) + \text{req\_rate}(f_k), \tag{18}$$

$$\text{Avail}(t) = \text{Avail}(t) - \text{req\_rate}(f_k) \tag{19}$$

The AN continues monitoring QoS statistics for all admitted flows, and to monitor network related statistics. The monitoring provides feedback for adapting the subscription factor.

Adaptation Method for AS(t): Per-Sector QoS and Network Statistics

Figure 18B:
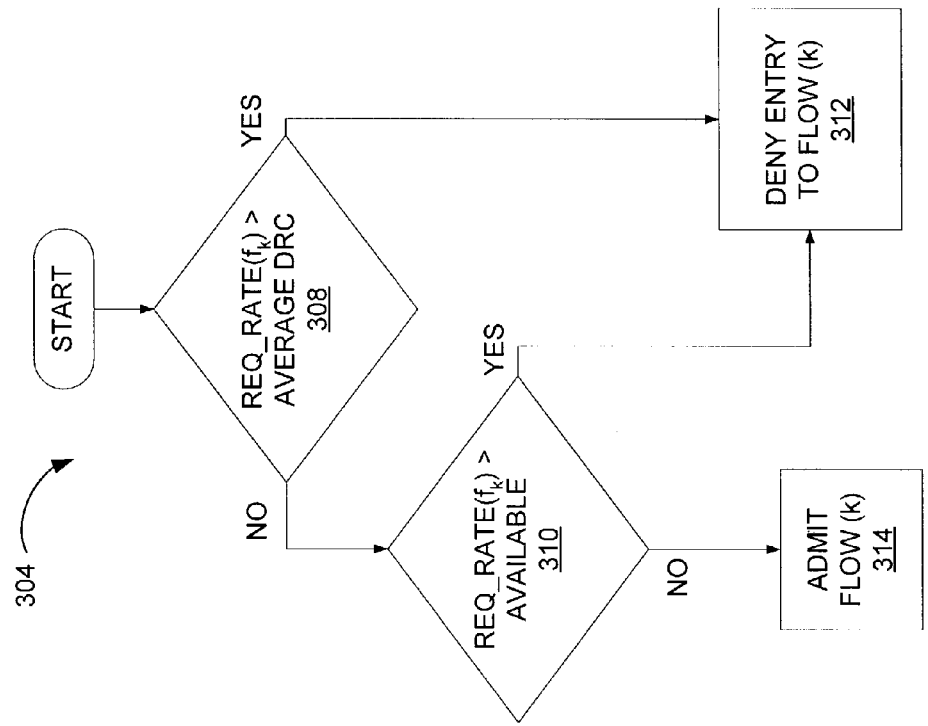
FIGS. 18A through 18E illustrate an algorithm for admission control in a High Rate Packet Data type system supporting multiple application flows having Quality of Service (QoS) requirements
Figure 18A:
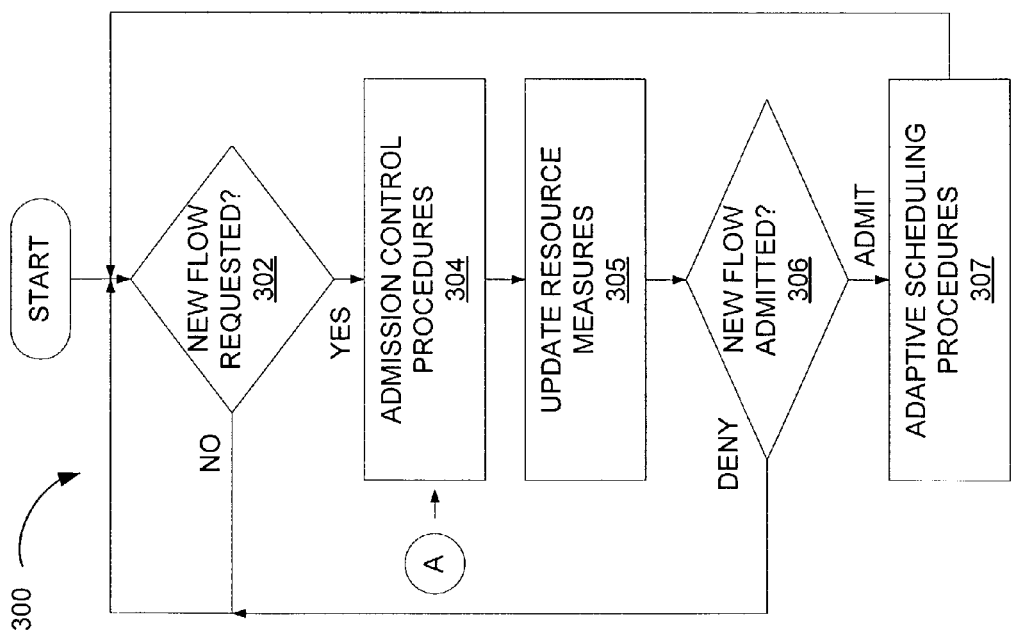

FIGS. 18A through 18E provide a flow diagram of a method 300 for admission control for a system supporting multiple application flows having QoS requirements. In FIG. 18A, when a request for a new flow is received by the AN at decision diamond 302, admission control procedures are applied at step 304. Else, the process waits for a new flow request. Note that during this time, the AN continues to monitor current operating conditions to develop QoS statistics for currently active flows and network statistics for flows. Admission control procedures determine if resources are available to support the new flow. Resource measures, such as illustrated in FIG. 14, are updated at step 305. If a new flow is admitted at decision diamond 306, processing continues to step 307 for application of an adaptive scheduling process.

The admission control procedures of step 304 are further detailed in FIG. 18B. At decision diamond 308 if the required rate for the flow $f_k$ is greater than an average DRC data request for the flow $f_k$, processing continues to step 312 to deny entry of the flow $f_k$. Else, processing returns to decision diamond 310 to determine if the required rate for flow $f_k$ is greater than the available resources, Avail, at time t. If the required rate is less than Avail, then the flow is admitted at step 314, else the flow is denied at step 312.

Figure 18C:
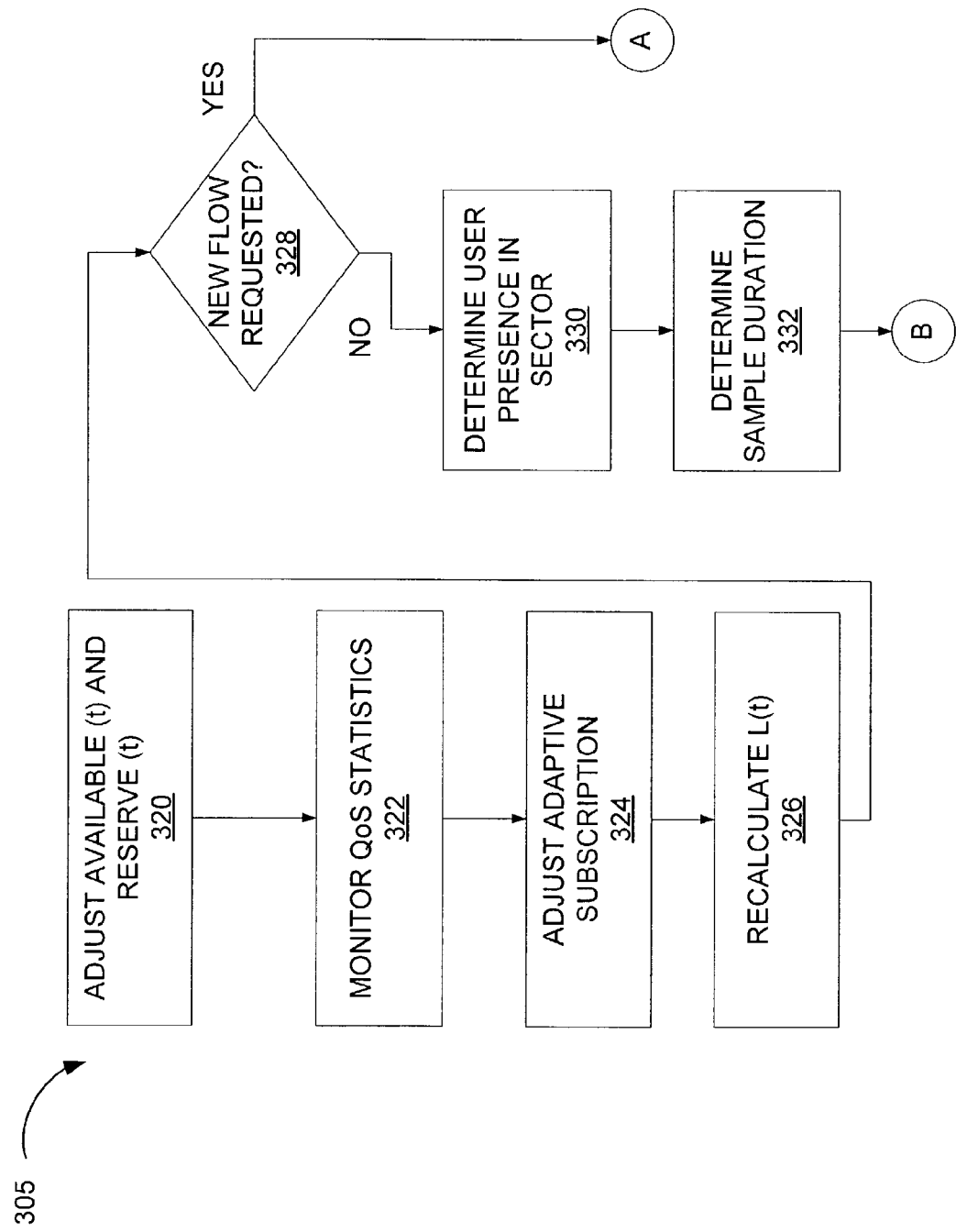

The updating of resource measures of step 305 are further detailed in FIG. 18C. At step 320 the resource measures, Avail and Res, are updated. QoS statistics are updated and monitored at step 322. The ASF is updated at step 324 based on the results of steps 320 and 322. The estimated resource level, L, is recalculated at step 326. If a new flow is requested at step 328 processing returns for processing at step 304 of FIG. 18A. If a new flow is not requested at step 328, then user presence in the sector is determined at step 330 for each user. At step 332 a sample duration period is determined.

Figure 18D:
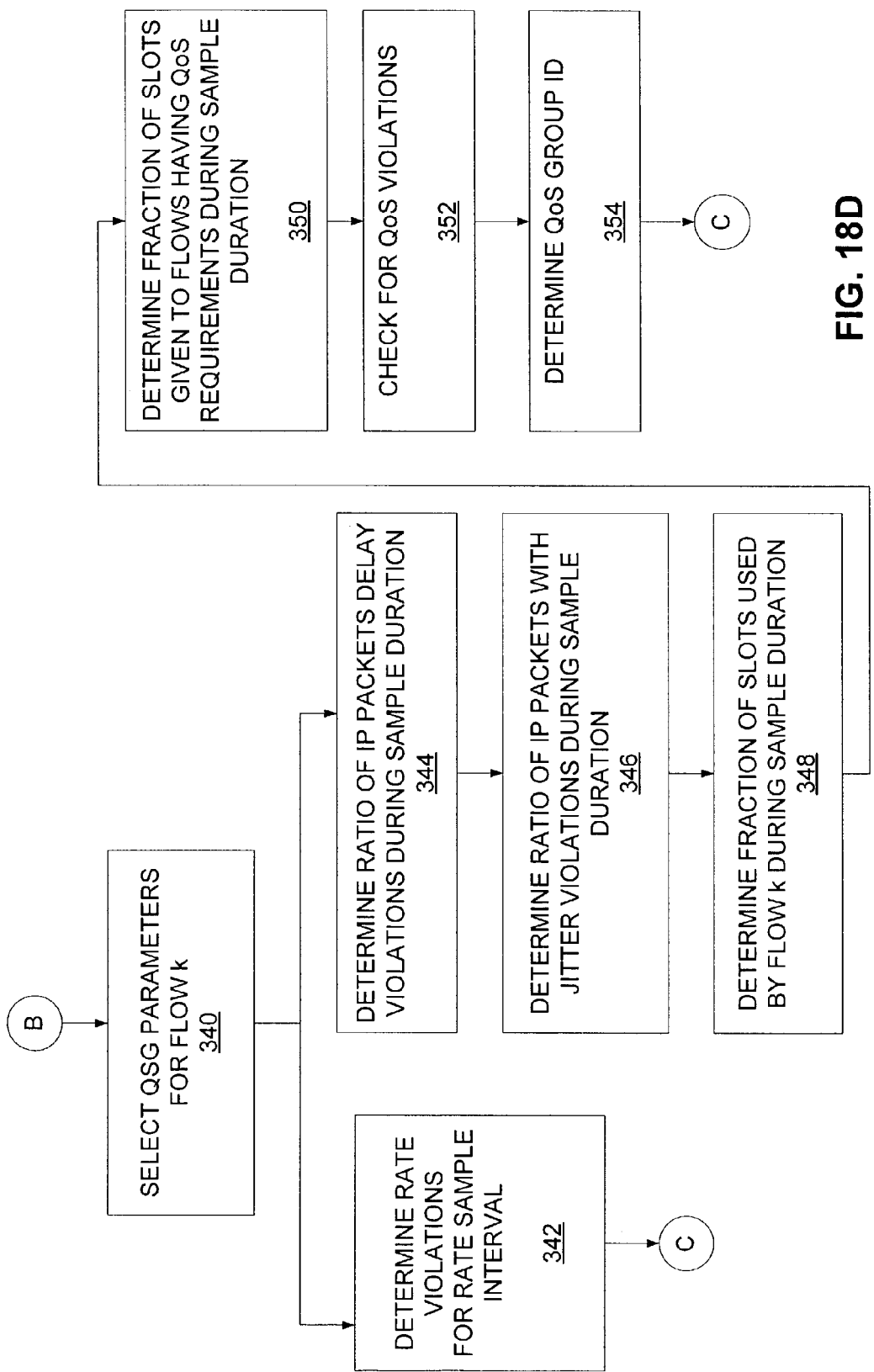

Continuing with FIG. 18D, QSG parameters are selected for each flow. Two parallel processing paths are considered, wherein a first path processes rate violations at step 342 over a rate sample interval. Note the rate sample interval is greater than the sample duration calculated at step 332. A second path details processing of each active flow. For a given flow, the process determines a ratio of IP packets having delay violations during the sample duration at step 344. At step 346, a ratio of IP packets with jitter violations during the sample duration is calculated for the flow under consideration. The fraction of slots used by the flow during the sample duration is then calculated at step 348. At step 350 the process determines a fraction of slots given to flows having QoS requirements during the sample duration. At step 352 the process checks for QoS violations and determines the QoS group ID at step 354.

Figure 18E:
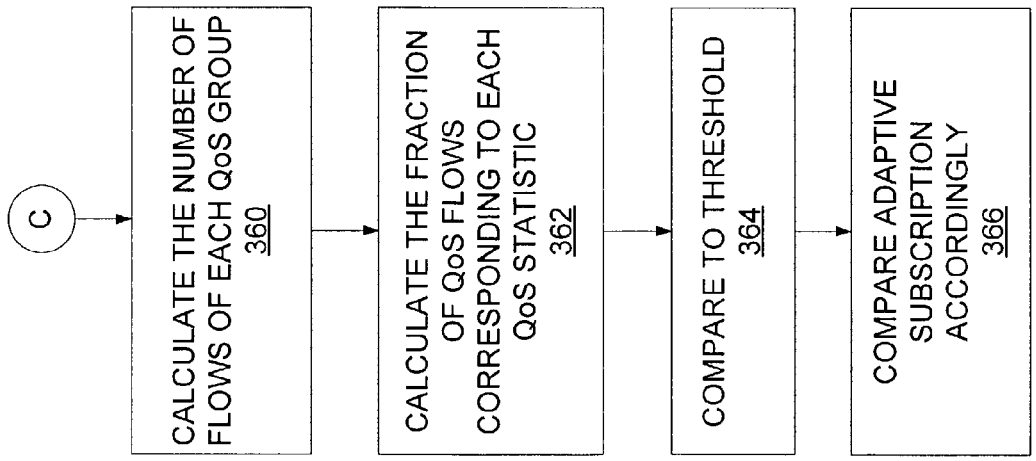

Processing continues to FIG. 18E wherein step 360 calculates the number of flows for each QoS group. At step 362 the process then calculates the fraction of QoS flows corresponding to each QoS statistic. The results of step 360 and 362 are then compared to predetermined threshold values at step 364. Note the threshold values may be updated dynamically during operation. At step 366 the ASF are adjusted accordingly.

FIGS. 18A through 18E provide one embodiment of an admission control method. Further details of an admission control method are discussed hereinbelow. The AN element, such as BTS, collects per-sector statistics for each flow and uses this information for per-sector admission control and preemption algorithms. Per-sector statistics are collected only for the duration when the user corresponding to that flow is in that sector. The BTS collects the QoS and network related statistics periodically. Let T be the time period after which these are collected, wherein Z is the sample index, t=Z*T.

Consider flow $f_k$ in sector s, wherein $u(f_k)$ is a user corresponding to flow $f_k$. The user enters the sector s, at time $t_{enter}$. Resources are reserved for this flow in the duration $[t_{reserve}(f_k,s), t_{free}(f_k,s)]$ within sectors, wherein the resources are reserved at time $t_{reserve}$. Resources are reserved at the time when the user requests an application service. The user $u(f_k)$ enters the sector s for the jth time in the above duration at $t_{enter,j}(f_k,s)$ and leaves for the jth time at $t_{leave,j}(f_k,s)$. Thus, $t_{reserve}(f_k,s) \leq t_{enter,first}(f_k,s)$ and $t_{free}(f_k,s) \geq t_{leave,last}(f_k,s)$. Note that it is possible that an AN may be told to reserve resources for a flow via a QoS signaling protocol in anticipation that the user may move to this sector at some future point of time. Here, $t_{enter,first}(f_k,s)$ is the first time when the user $u(f_k)$ enters this sector s and $t_{leave,last}(f_k,s)$ is the last time when this user leaves sector s during the lifetime of flow $f_k$.

The algorithm takes the QoS and network related performance statistics into account at time t only if the following three conditions are satisfied at that time:

$$t_{reserve}(f_k,s) \leq t \leq t_{free}(f_k,s), \tag{20}$$

$$t_{enter\_latest}(f_k,s) + \delta(f_k) \leq t \leq t_{leave\_latest}(f_k,s), \text{ and} \tag{21}$$

$$IN\_IP\_PKTS(f_k,t,s) > \theta(f_k) \tag{22}$$

wherein $\delta(f_k)$ and $\theta(f_k)$ are pre-specified for flow $f_k$ and IN_IP_ PKTS($f_k$,t,s) is the number of input IP packets for flow $f_k$ scheduled for transmission by the BTS forward link scheduler during the period $(\max(t-T, t_{enter\_latest}(f_k,s)), t]$ in sector s. If the last bit of an IP packet is transmitted in sector s, that bit is counted in IN_IP_PKTS for the sector. The variable $\delta(f_k)$ refers to the time after which the presence in the sector is considered significant. In other words, once the user is in the sector s for $\delta$ seconds the process starts evaluating resources. Note, once admitted, a user may leave and re-enter the sector without requiring readmission.

The QoS and network statistics are then used to evaluate the admission criteria for each flow requesting an application service. The fraction of delayed IP packets corresponding to flow $f_k$ in the sector s in the period $(\max(t-T, t_{enter\_latest}(f_k,s)), t]$, is calculated as:

$$\text{Frac\_delayed\_IP\_Pkts}(f_k, t, s) = \frac{\text{DELAYED\_IP\_PKTS}(f_k, t, s)}{\text{IN\_IP\_PKTS}(f_k, t, s)} \quad (23)$$

wherein the DELAYED_IP_PKTS($f_k$,t,s) corresponds to the number of IP packets delayed beyond a corresponding delay bound for flow $f_k$ at the BTS for sector s by time t. On detection of a delay violation for an IP packet in sector s, the count of delay violation for that sector is incremented. The fraction of IP packet pairs having jitter bound violations for flow $f_k$ by time t is calculated as:

$$\text{Frac\_jitter\_viol}(f_k, t, s) = \frac{\text{JTR\_VIOL\_PKT\_PAIRS}(f_k, t, s)}{\text{IN\_IP\_PKTS}(f_k, t, s) - 1}, \quad (24)$$

wherein JTR_VIOL_PKT_PAIRS($f_k$,t) corresponds to the number of IP packet pairs (of consecutive IP packets) with jitter bound violations for flow $f_k$ by slot t. This is counted for a sector when two consecutive IP Packets for a flow were transmitted on that sector.

Rate violation of flow $f_k$ during the period $(t_{enter\_latest}(f_k,s), t]$, $$\text{Rate\_viol}(f_k, t, s) = \frac{\text{req\_rate}(f_k) - \text{served\_rate}(f_k, t, s)}{\text{req\_rate}(f_k)} \quad (25)$$

wherein req_rate($f_k$)>served_rate($f_k$,t,s). Otherwise, when flow $f_k$ has no rate violation at time t, the served_rate($f_k$,t,s) for flow $f_k$ in the sector s during the time period $(t_{enter\_latest}(f_k,s), t]$ is calculated Note, for rate violation, the process applies the sample duration as the period $(t_{enter\_latest}(f_k,s), t]$, while for delay and jitter violation, the process applies the sample duration as the period $(\max(t-T, t_{enter\_latest}(f_k,s)), t]$.

The fraction of slots used by the flow $f_k$ during the period $(\max(t-T, t_{enter\_latest}(f_k,s)), t]$ is calculated as:

$$\text{Frac\_slots\_flow}(f_k, t, s) = \frac{\text{SERVED\_SLOTS}(f_k, t, s)}{\text{IN\_SECTOR}(f_k, t, s)}, \quad (26)$$

wherein the SERVED_SLOTS($f_k$, t, s) is the number of slots for which the flow $f_k$ was served during the period defined by $(\max(t-T, t_{enter\_latest}(f_k,s)), t]$, and the IN_SECTOR($f_k$,t,s) is the total number of slots during the period $(\max(t-T, t_{enter\_latest}(f_k,s)), t]$. The fraction of slots given to flows having QoS requirements in the sector s during the period (t–T,t] is given as:

$$\text{frac\_slots\_qos\_flows}(t, s) = \frac{\substack{\text{Number of slots given to} \\ \text{QoS flows during } (t-T, t] \text{ in sector } s}}{T(\text{slots})} \quad (27)$$

Dynamic Flow Classification

For each flow $f_k$, the following four thresholds are pre-specified and used to perform per-flow QoS and channel condition related checks:

Frac_delayed_IP_pkts_thres($f_k$),

Frac_jitter_vivo_IP_pkts_thres($f_k$), rate_vivo_thres($f_k$), and

Frac_slots_vivo_thres($f_k$).

The system adapts the ASF periodically after each time T, wherein T is a pre-specified value. At a given time t when an adaptation check is performed for the Zth time (i.e. t=Z*T), the process considers those flows that have some resources reserved in sector s, i.e. for which $t_{reverse}(f_k,s) \leq t \leq t_{free}(f_k,s)$. For each flow $f_k$ from this set of flows, a check is made to evaluate the following "per-flow threshold checks":

$$\text{Frac\_delayed\_IP\_Pkts}(f_k,t,s) > \text{Frac\_delayed\_IP\_pkts\_thres}(f_k), \quad (28)$$

$$\text{Frac\_jitter\_vivo\_IP\_pkts}(f_k) > \text{Frac\_jitter\_vivo\_IP\_pkts\_thres}(f_k,t,s), \quad (29)$$

$$\text{Rate\_vivo}(f_k,t,s) > \text{rate\_vivo\_thres}(f_k), \quad (30)$$

$$\text{Frac\_slots\_flow}(f_k,t,s) > \text{Frac\_slots\_vivo\_thres}(f_k). \quad (31)$$

The above four checks are performed for flow $f_k$ if the following two conditions are satisfied:

$$t_{enter\_latest}(f_k,s) + \delta(f_k) \leq t \leq t_{leave,latest}(f_k,s), \text{ and} \quad (32)$$

$$\text{IN\_IP\_PKTS}(f_k,t,s) > \theta(f_k). \quad (33)$$

When at least one of the conditions (32), (33) are not satisfied for a flow, but $t_{reserve}(f_k,s) \leq t \leq t_{free}(f_k,s)$ is true, the result of the per-flow threshold checks is marked as NA for that flow.

The process calculates a fraction of slots, during the sample duration, used for flows having QoS requirements, and also calculates a threshold for this fractional value, wherein Frac_slots_thres_qos_flows(s) is an upper threshold on the fraction of slots assigned to flows having QoS requirements in the time period T in sector s. The value of Frac_slots_thres_qos_flows(s) is used to check if:

$$\text{frac\_slots\_qos\_flows}(t,s) > \text{Frac\_slots\_thres\_qos\_flows}(s). \quad (34)$$

The process classifies the current flows into one of the following QoS Scheduling Groups (QSGs):

QSG I or Q_DJR: Flows that have delay, jitter and rate requirements,

QSG II or Q_RavgD: Flows that have rate and average delay requirements,

QSG III or Q_R: Flows that have rate requirements.

Consider the set of flows belonging to the Q_DJR class. If a given flow, $f_k$, does not qualify for the NA category, and has either:

$$Frac\_delayed\_IP\_Pkts(f_k,t,s) > Frac\_delayed\_IP\_pkts\_thres(f_k), \quad (35)$$

or $$Frac\_jitter\_vivo\_IP\_pkts(f_k,t,s) > Frac\_jitter\_vivo\_IP\_pkts\_thres(f_k), \quad (36)$$

this flow is designated as having delay_or_jitter_vivo($f_k$,t,s)=Y. Otherwise, the process sets delay_or_jitter_vivo($f_k$,t,s)=N, for this flow. On the other hand, if this flow qualified in the NA category, then the delay_or_jitter_vivo($f_k$,t,s)=NA.

TABLE 2

| QoS Stat Group Id (QS_GID) | QoS Class | delay_or_jitter_viol(fk, t, s) | rate_viol(fk, t, s) > rate_viol_thres(fk) |
|---|---|---|---|
| 1 | For Q_DJR Flows | Y | Y |
| 2 | For Q_DJR Flows | Y | N |
| 3 | For Q_DJR, Q_RavgD, Q_R flows | N | Y |
| 4 | For Q_DJR, Q_RavgD, Q_R flows. | N (or NA) | N (or NA) |

At every time t when the adaptation check for AS(t) is performed, the process classifies the QoS flows, i.e., flows having QoS requirements, as shown in Table 2. Each flow is assigned a QoS Stat Group ID (QS_GID).

QS_GID=1: flows of the Q_DJR class having rate and delay (or jitter) violations.

QS_GID=2: flows of the Q_DJR class, having delay (or jitter) violations without rate violations.

QS_GID=3: flows of the Q_DJR class without delay and jitter violations but having rate violations. This case may arise for adaptive applications. Also, flows corresponding to the Q_R and Q_RavgD classes having rate violations are assigned to this group.

QS_GID=4: flows without QoS (rate, delay and jitter) violations. Flows in the NA category, as described hereinabove, are also put in this group.

Adaptation of Subscription Factor

Let $N_k(t,s)$ be the number of flows corresponding to QSG k at time t and N(t,s) be the total number of flows for which there are some resources reserved in sector s at time t.

$$N(t,s) = \sum_k N_k(t,s) \quad (37)$$

Let M denote the QoS stat group id (QS_GID) resulting in:

$$N_{Q\_DJR}(t) = \sum_{M=1}^{4} N_{Q\_DJR}(t, M). \quad (38)$$

$$N_{Q\_RAvgD}(t) = \sum_{M=3}^{4} N_{Q\_RAvgD}(t, M) \quad (39)$$

$$N_{Q\_R}(t) = \sum_{M=3}^{4} N_{Q\_R}(t, M) \quad (40)$$

The fraction of flows corresponding to the QSG of flow k, QSG k, in the QoS stat group M at time t (in sector s) is given as:

$$F_k(t, M, s) = \frac{N_k(t, M, s)}{N_k(t, s)} \quad (41)$$

The fraction of flows with delay (or jitter) and rate violation at time t, is given as:

$$Frac\_flows\_DJR\_vivo(t,s) = F_{Q\_DJR}(t, M=1, s) \quad (42)$$

The fraction of flows with delay (or jitter) violation but no rate violation at time t, are given as:

$$Frac\_flows\_DJ\_vivo(t,s) = F_{Q\_DJR}(t, M=2, s) \quad (43)$$

The fraction of flows with only rate violation at time t, are given as:

$$Frac\_flows\_R\_only\_viol(t,s) = \frac{N_{Q\_DJR}(t, M=3, s) + N_{Q\_RAvgD}(t, M=3, s) + N_{Q\_R}(t, M=3, s)}{N_{Q\_DJR}(t, s) + N_{Q\_RAvgD}(t, s) + N_{Q\_R}(t, s)} \quad (44)$$

The fraction of flows with no QoS violation (or which are in the NA category), are given as:

$$\text{Frac\_flows\_no\_na\_viol}(t, s) = \frac{N_{Q\_DJR}(t, M=4, s) + N_{Q\_RAvgD}(t, M=4, s) + N_{Q\_R}(t, M=4, s)}{N_{Q\_DJR}(t, s) + N_{Q\_RAvgD}(t, s) + N_{Q\_R}(t, s)} \quad (45)$$

Adaptation of S(t) is done periodically after every time period T, which is pre-specified. For the purpose of adaptation, the above groups may be considered as follows:

TABLE 3

| QSG | Fraction of flows with QS_GID = 1 | Fraction with QID = 2 | Fraction with QID = 3 | Fraction with QID = 4 |
| --- | --- | --- | --- | --- |
| QSG_DJR | Frac_flows_DJR_viol(t, s) | Frac_flows_DJ_viol(t, s) | Combined with Frac_flows_R_only_viol(t, s) | Combined with Frac_flows_no_na_viol(t, s) |
| QSG_RavgD | Not applicable | Not used | Combined with Frac_flows_R_only_viol(t, s) | Combined with Frac_flows_no_na_viol(t, s) |
| QSG_R | Not applicable | Not applicable | Combined with Frac_flows_R_only_viol(t, s) | Combined with Frac_flows_no_na_viol(t, s) |

The following thresholds are pre-specified, and used in the adaptation method shown below.

Frac_flows_thres_DJR: A threshold on fraction of flows with delay (or jitter) and rate violation Frac_flows_thres_DJ: A threshold on fraction of flows with delay (or jitter) violation and no rate violation Frac_flows_thres_R: A threshold on fraction of flows with rate violation (and no delay or jitter violation)

Frac_flows_thres_ok_qos: A threshold on fraction of flows with no QoS violation

The process continues in the following order at each time instant when an adaptation check is performed for AS(t):

Step 1: If Frac_flows_DJR_vivo(t,s)≧Frac_flows_thres_DJR: $AS(t^+) = f_{qos} * AS(t) + x_{qos}$, such that $AS(t^+) \geq AS(t)$. Here, $f_{qos}$ and $x_{qos}$ are pre-specified. Otherwise, Step 2: If Frac_flows_DJ_vivo(t,s)≧Frac_flows_thres_DJ, $AS(t^+) = f_{delay\_jitter} * AS(t) + x_{delay\_jitter}$ such that $AS(t^+) \geq AS(t)$. Here, $f_{delay\_jitter}$ and $x_{delay\_jitter}$ are pre-specified. Otherwise, Step 3: If Frac_flows_R_only_vivo(t,s)≧Frac_flows_thres_R, $AS(t^+) = f_{rate} * AS(t) + x_{rate}$, such that $AS(t_+) \geq AS(t)$. Here, $f_{rate}$ and $x_{rate}$ are pre-specified. Otherwise:

Step 4: If Frac_flows_no_na_vivo(t,s)<Frac_flows_thres_ok_qos, $AS(t^+) = f_{all\_qos\_flows} * AS(t) + x_{all\_qos\_flows}$, such that $AS(t^+) \geq AS(t)$. Here, $f_{all\_qos\_flows}$ and $x_{all\_qos\_flows}$ are pre-specified. Otherwise:

Step 5: If Frac_flows_no_na_vivo(t,s)≧Frac_flows_thres_ok_qos, and if frac_slots_qos_flows(t,s)<Frac_thres_slots_qos_flows,: $AS(t^+) = f_{ok} * AS(t) + x_{ok}$, such that $AS(t+) \leq AS(t)$. Here, $f_{ok}$ and $x_{ok}$ are pre-specified. Otherwise.

Step 6: If Frac_flows_no_na_vivo(t,s)≧Frac_flows_thres_ok_qos, and if frac_slots_qos_flows(t,s)≧Frac_thres_slots_qos_flows, $AS(t^+) = AS(t)$.

Preemption Scheme

Figure 19:
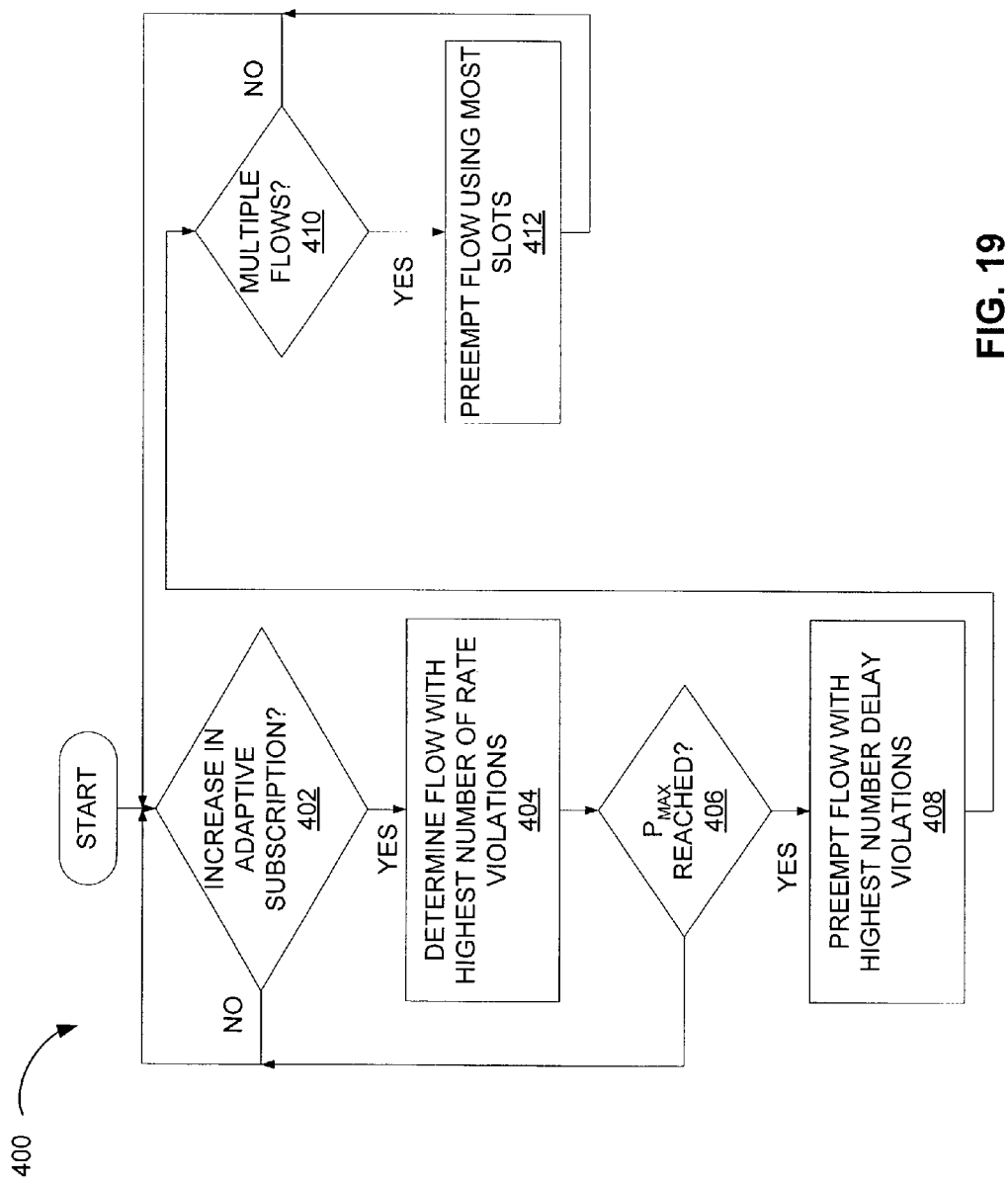
FIG. 19 illustrates an algorithm for preemption in a High Rate Packet Data type system supporting multiple application flows having Quality of Service (QoS) requirements.

FIG. 19 illustrates a preemption method 400 according to one embodiment. The method 400 begins by determining if the ASF was increased at decision diamond 402. When an ASF increase is detected, processing continues to step 404 to determine the flow having the highest number of rate violations. In other words, when the ASF increases, the preemption method 400 begins to identify those flows to preempt. In the present embodiment, flows with rate violations are identified as the best candidates for preemption. Alternate embodiments may prioritize other flows, and may dynamically change the priority scheme.

If a preemption maximum value, $P_{MAX}$, (detailed hereinbelow) is reached at decision diamond 406, processing continues to step 408 to preempt the flow having the highest number of delay violations. Else processing returns to decision diamond 402. After preempting a flow at step 408, processing continues to decision diamond 410 to determine if there are multiple flows having the highest number of-delay violations. For multiple flows, processing continues to step 412 to preempt the flow using the most slots. Typically, this flow will have a low data rate and therefore consumes the most slots during a given time period. Processing then returns to decision diamond 402.

In one embodiment, the preemption method 400 is applied wherein P_max is the maximum number of flows that are allowed to be preempted at any given point of time. Consider a subset of flows satisfying the conditions for two preemption groups shown in the Table 3. Specifically, preemption group I consists of flows belonging to QSG_R or QSG_RavgD and have $$\text{rate\_vivo}(f_k, t, s) > \text{rate\_vivo\_thres}(f_k), \text{ and} \quad (46)$$

$$(Frac\_\text{slots\_flow}(f_k, t, s) > frac\_\text{thres\_slots\_flow}(f_k). \quad (47)$$

Preemption group 2 consists of flows belonging to the Q_DJR QSG and having $$\text{Frac\_delayed\_IP\_Pkts}(f_k,t,s) > \text{Frac\_delayed\_IP\_pkts\_thres}(f_k) \text{ and} \quad (48)$$

$$\text{Frac\_slots\_flow}(f_k,t,s) > \text{frac\_thres\_slots\_flow}(f_k). \quad (49)$$

TABLE 4

| Preemption group id | QSG | QoS violation | Slots threshold violation |
|---|---|---|---|
| 1 | Q_R, Q_RavgD | rate_viol(fk, t, s) > rate_viol_thres(fk) | Frac_slots_flow(fk, t, s) > frac_thres_slots_flo(fk) |
| 2 | Q_DJR | Frac_delayed_IP_Pkts (fk, t, s) > Frac_delayed_IP_pkts_thres(fk) | Frac_slots_flow(fk, t, s) > frac_thres_slots_flow(fk) |

Step 1: If AS(t) is increased (as in the adaptation method for AS(t)) at some point in time, the process checks to see if one or more flows qualifies for preemption. Note, when AS(t) is not increased, and no flow is preempted.

Step 2: Consider the subset of flows corresponding to preemption group 1. Out of these flows, select P_max number of flows that have the highest value of rate_vivo. If there is a tie, preempt ones with higher value of Frac_slots_flow. If P max flows were preempted, then no more flows are preempted for rate violations.

Step 3: Consider the subset of flows that correspond to preemption group 2. These flows have delay and jitter requirements and have Frac_delayed_IP_Pkts($f_k$,t,s)>Frac_delayed_IP_pkts_thres($f_k$,) and Frac_slots_flow($f_k$,t,s)>frac_thres_slots_flow($f_k$). Out of these flows, select P_max minus the number of flows preempted in step 2, which have the highest value of Frac_delayed_IP_Pkts. If there is a tie, preempt ones with the higher value of Frac_slots_flow.

Intra and Inter User QoS

A mobile user may have multiple flows, i.e., multiple applications concurrently. As presented herein, a user may specify the following:

Per-flow indication whether or not it is delay and jitter sensitive. If it is delay and jitter sensitive, delay and jitter bounds are to be specified.

An Aggregate Target Rate (ATR) for each user. This is the target rate that the forward link hierarchical scheduler would aim to give to this user.

Admission Control

Given R(t) users at time t denoted as $U_1, U_2, \ldots, U_{R(t)}$, consider num_flows($U_j$,t) as the number of flows of user $U_j$ at time t. Suppose, user $U_j$ has (k-1) flows admitted at time t, i.e. num_flows($U_j$,t)=k-1. To decide to admit a new flow $f_{k,j}$, for user $U_j$ at time t, the process uses the observed DRC for the user $U_j$ to check the following:

$$\sum_{c=1}^{k} \text{req\_rate}(f_{c,j}) \leq Avg(drc(U_j)). \quad (50)$$

Number of slots taken by a flow and its corresponding DRC are also taken into account while doing adaptation of ASF as described earlier. The process computes AS(t) and computes Avail(t) as:

$$Avail(t) = \text{maximum}\left(\frac{L_{\max}}{AS(t)} - \text{Res}(t), 0\right) \quad (51)$$

The process admits the flow $f_{k,j}$ at time t if $$\text{req\_rate}(f_{k,j}) \leq Avail(t) \quad (52)$$

If this flow is admitted, updates are as follows:

$$Res(t) = Res(t) + \text{req\_rate}(f_{k,j}), \quad (53)$$

$$Avail(t) = Avail(t) - \text{req\_rate}(f_{k,j}) \quad (54)$$

$$ATR(U_j,t) = ATR(U_j,t) + \text{req\_rate}(f_{k,j}) \quad (55)$$

The process continues monitoring QoS statistics for all the admitted flows and users, and monitoring network related statistics. Use these to continue adapting the subscription factor. The ASF, AS(t), is then computed and applied.

Hierarchical Scheduler

Per-Flow and Per-User Compensation:

Each delay and jitter sensitive flow is assigned a jitter threshold. For each delay and jitter sensitive flow fx for user $U_k$, the process computes the corresponding delay and jitter compensation, $\phi$. If the flow does not have any packet in a queue that has crossed a delay threshold, then $$\phi(fx(U_k)) = 1. \quad (56)$$

Otherwise, compute $$\phi(fx(U_k)) = C_{delay}(fx(U_k)) * \frac{ndefpkts(fx(U_k), n)}{ndefpkts_{\min}(n)} \quad (57)$$

Here:

$$ndefpkts(fx(U_k), n) = \frac{defpkts(fx(U_k), n)}{\text{req\_rate}(fx(U_k))} \quad (58)$$

for each flow fx of user $U_k$, $$ndefpkts_{min}(n) = \text{minimum of } ndefpkts \quad (59)$$

considering all flows (across all users) at slot n, $defpkts(fx(U_k,n))$=number of pending MAC packets of flow fx of user $U_k$ that have violated their delay threshold at slot n. (60)

For rate compensation of user $U_k$ at slot n, define, $$\alpha(U_k, n) = \frac{ATR(U_k)}{ASR(U_k, n_{prev}(n))} \quad (61)$$

Here, $ASR(U_k, n_{prev}(n))$=aggregate served rate of user $U_k$ in slot $n_{prev}$, and (62)

$n_{prev} \leq n.$ (63)

Slot number $n_{prev}$ is the last slot on or before n when the rate was monitored for the purpose of the scheduling algorithm.

The process defines an aggregate delay compensation for user $U_k$ at an arbitrary slot n. Consider all the flows of this user that have delay requirements and look at the Head Of Line (HOL) MAC packet for each of these delay sensitive flows. If none has been in the system for a period longer than its delay threshold, then:

agg_delay_comp($U_k$,n)=1. (64)

Otherwise, consider the subset of flows for this user that have an HOL packet in the system for a period longer than the delay threshold. For this user, compute:

$$\text{agg\_delay\_comp}(U_k, n) = \sum_x w(fx(U_k)) * \phi(fx(U_k), n), \quad (65)$$

for all flows fx of user $U_k$ that have HOL MAC packets in the system for a period larger than the delay thresholds of these flows. Here, $w(fx(U_k))$ is the initial weight assigned to flow fx of user $U_k$.

Adaptive Weight Computation

For computing adaptive weights for this user the process performs a delay threshold violation check in every slot for each flow for each user having at least one delay sensitive flow. The process computes:

agg_delay_comp($U_k$,n) (66)

for each such user $U_k$. If agg_delay_comp($U_k$,n)>1, the process computes adaptive weights for user $U_k$ as follows:

$aw^1(U_k,n)$=agg_delay_comp($U_k$,n)*$aw^1(U_k,n-1)$ (67)

On the other hand, if agg_delay_comp($U_k$,n)=1, the process computes:

$aw^1(U_k, n) = \alpha(U_k, n_{prev}(n)) * w(U_k)$ (68)

Here, $n_{prev,k}(n)$ is the last slot on or before n when ASR($U_k$, $n_{prev}(n)$) was monitored (and thus $\alpha(U_k, n_{prev}(n))$ was computed). The process continues to compute final adaptive weight for this user as follows:

$aw(U_k,n)=Z(U_k,n)*aw^1(U_k,n)$ (69)

Here, $Z(U_k,n)=1$ if there is no packet in the RTx or the DARQ queue for any delay sensitive flow of user $U_k$. Otherwise, $Z(U_k,n)=C(U_k)$. Here, $C(U_k)$ is a pre-specified constant.

User and Flow Selection Method

The process computes the following metric for each user that has at least one packet in its queues, in slot n:

$Y(U_k,n)=aw(U_k,n)*DRC(U_k,n)/T(U_k,n)$ (70)

Here, $$T(U_k, n) = \sum_{fz} T(fz(U_k), n),$$

is the average served rate for user $U_k$ (i.e. including all corresponding flows). The process selects the user with the maximum value of $Y(U_k,n)$. Once a user has been selected using such a scheduler, the process selects a flow to serve for that user as per the following scheme.

Consider flows classified in the following groups:
Group 1: QSG_delay_jitter. VoIP flows.
Group 2: QSG_delay_jitter. Video conferencing flows.
Group 3: QSG_delay_jitter. Video streaming flows.
Group 4: QSG_rate_avg_delay. Flows with rate and average delay requirements.
Group 5: QSG_rate. Flows with only rate requirements.

The following steps may be followed in performing the scheduling algorithm described herein.

Step 1: Consider all the backlogged flows of the selected user in that slot.

Step 2: Consider flows corresponding to groups 1 and 2 for that user. Select a flow wherein HOL packet has violated its delay threshold and is closest to the delay bound for that flow. If a flow has been found, serve this flow. Otherwise, go to step 3.

Step 3: Consider flows corresponding to group 3 wherein an HOL packet has crossed the delay threshold and select the flow wherein an HOL packet is closest to the delay bound. If a flow is found, serve this flow. Otherwise, go to the next step.

Step 4: Consider flows corresponding to group 4 wherein an HOL packet has crossed the delay threshold and select the flow wherein an HOL packet is closest to the delay bound. If a flow is found, serve this flow. Otherwise, go to the next step.

Step 5: Pick up a backlogged flow to serve from groups 1 to 4. Give preference to the flow having the lowest number group. If a flow has been selected, serve it. Otherwise, go to the next step.

Step 6: Consider the backlogged flow corresponding to group 5 for that user. Select the one with the maximum value of required_rate/served_rate. Serve this flow. If none is selected, go to the next step.

Step 7: Serve a best effort flow for that user. If there are more than one, pick up one with the minimum value of the served rate.

Figure 16:
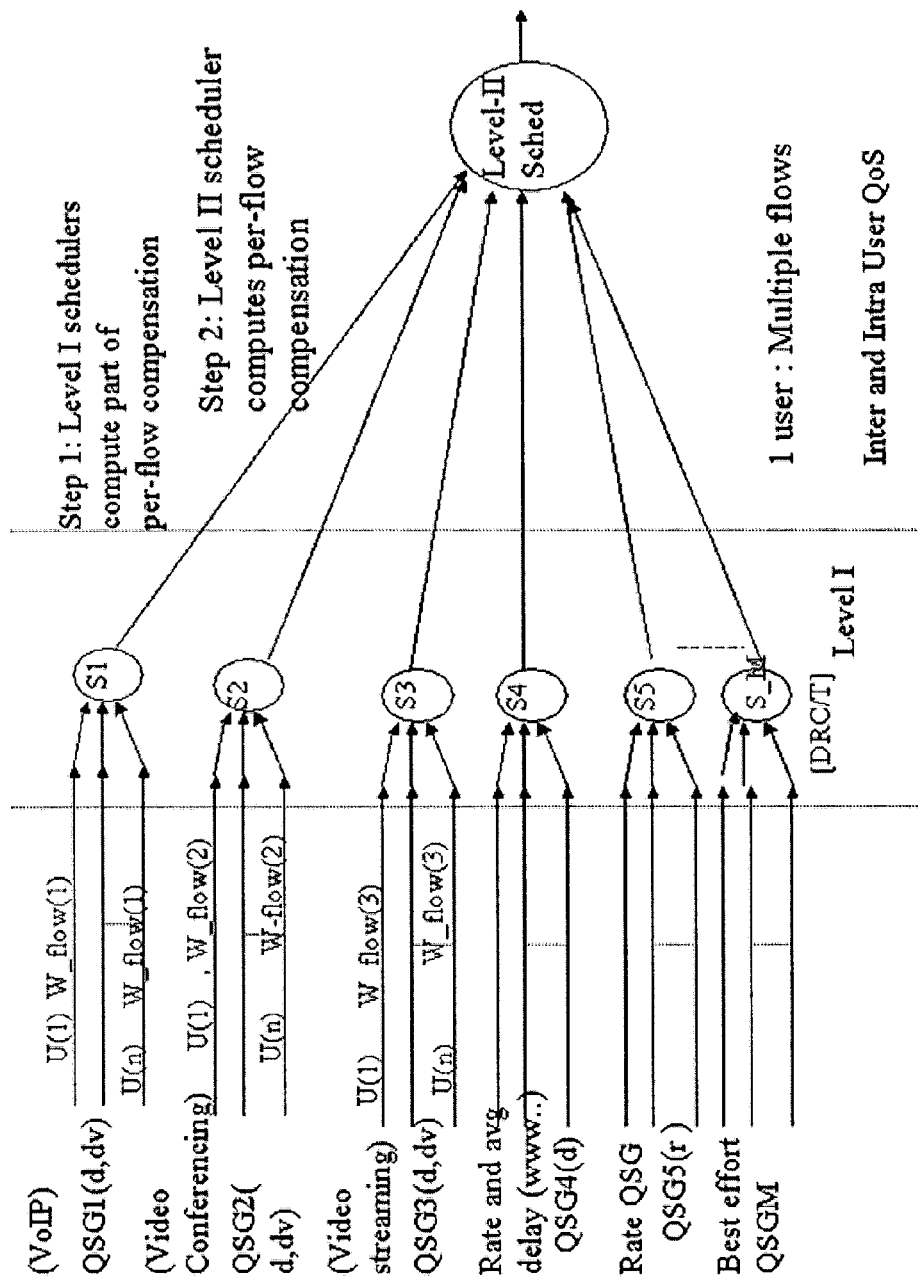
FIG. 16 is an information flow diagram illustrating a scheduler for a High Rate Packet Data type system supporting multiple application flows having Quality of Service (QoS) requirements, wherein the flows are scheduled by application of a per flow compensation.
Figure 17:
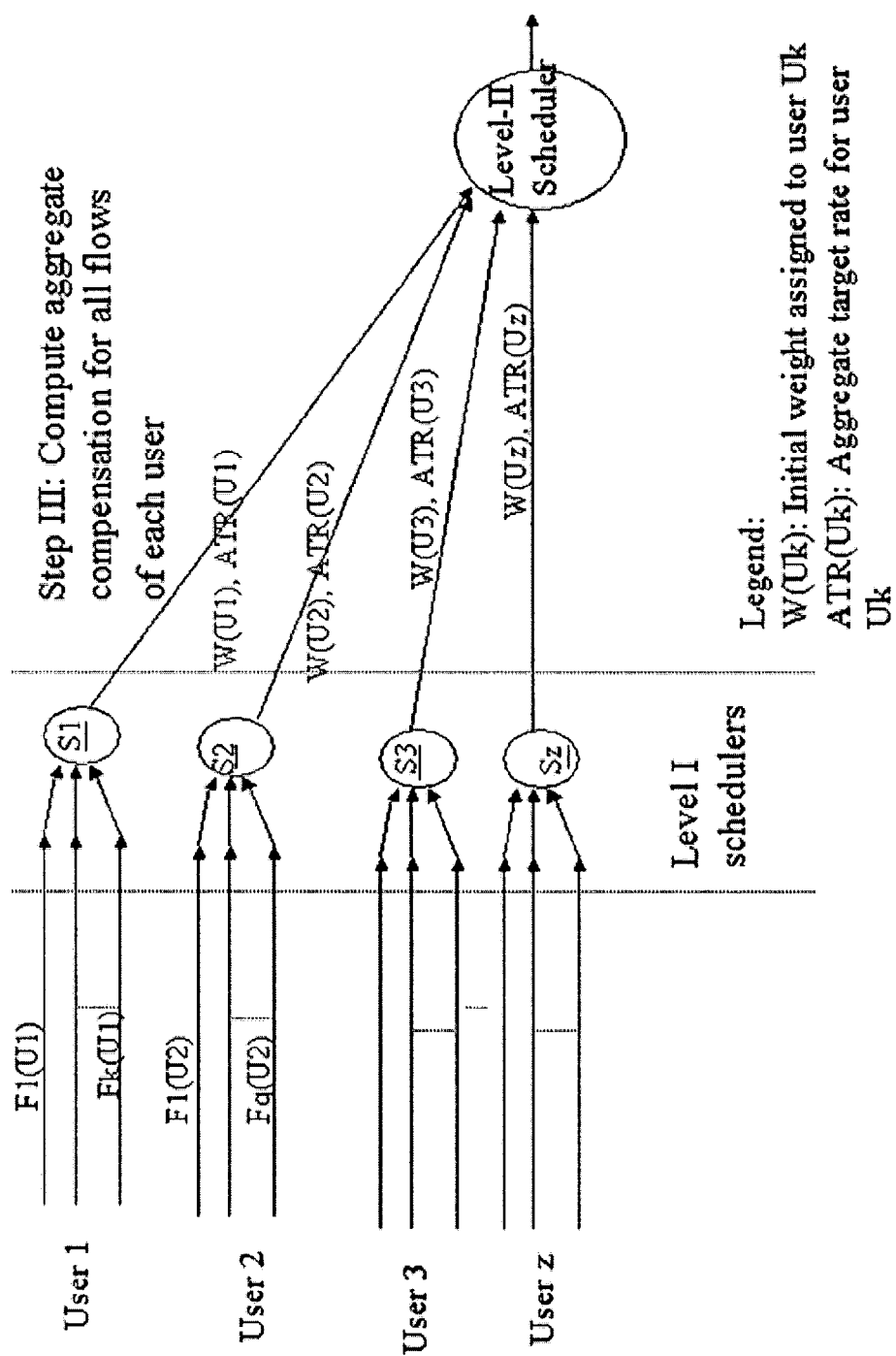
FIG. 17 is an information flow diagram illustrating a scheduler for a High Rate Packet Data type system supporting multiple application flows having Quality of Service (QoS) requirements, wherein the flows are scheduled by application of an aggregate compensation.

FIG. 16 illustrates a two level scheduler applying a per-flow and per-user compensation. The scheduler illustrated in FIG. 16 and FIG. 17 is a hierarchical scheduler used for inter and intra QoS compensation as described herein. As illustrated in FIG. 16, the first level, identified as Level I, includes multiple scheduling elements or nodes, S1, S2, ... SM, wherein each node processes a different QSG. In this example, M is the number of QSG groups that will be processed. For example, the scheduling node S1 processes Voice over IP (VoIP) type application flows. While VoIP is given as an example, any application flows classified as QSG1 will be processed at S1. Such flows have delay and jitter bounds specified for evaluating QoS requirements. Multiple application VoIP type flows are processed at the scheduling element S1. Similarly, each scheduling element processes flows for a specified QSG. Note that alternate embodiments may provide application flows for multiple QSGs to one scheduling element. Note, multiple scheduling elements may be used for processing a same QSG group.

The Level I of the scheduler illustrated in FIG. 16 computes a portion of the per-flow compensation. Multiple application flows for each user are illustrated in FIG. 16. The Level II scheduling element completes computation of the per-flow compensation.

FIG. 17 illustrates a scheduler having scheduling nodes S1, S2, . . . Sz. In this step, z is the number of users. Note, the number of users is dynamic and therefore the number of current scheduling nodes may change dynamically. Each scheduling node S1, S2, . . . Sz is adapted to receive multiple flows from a given user. Scheduling node S1 receives flows F1 through Fk for user 1 (U1). Here k is the total number of application flows currently processed for user 1. Using the per-flow compensation computed for each flow by level I and level II schedulers in FIG. 16, the level II scheduler in FIG. 17 computes aggregate user compensation for each user. The Level II scheduler then selects a user to serve in a slot as per the adaptive weighted DRC/T algorithm described above for user selection method. The Level II scheduler then selects among the weighted values received from the Level I schedulers. As indicated, W(Uk) is the initial weight assigned to user Uk, and ATR(Uk) is the aggregate target rate for user Uk. Once a user is selected, the Level I scheduler corresponding to that user selects a flow to serve for that user in that slot as per the flow selection method described above.

A forward link scheduler may allow each user to specify a willing price for a flow for service at a given DRC value in a slot. Once the price is specified, an adaptive frame structure scheduler works to meet QoS requirements of different types of applications. The corresponding scheduling mechanism allows a service provider to find a good balance between the goals of increasing profits and meeting QoS requirements of applications. Such scheduling mechanisms also provide end-users dynamic cost control, and may be used for applications having rate and/or average delay requirements or for streaming applications, etc. One embodiment provides a pricing option wherein each flow specifies the price for each slot when it is served. This price is dependent upon the DRC value requested by the user for the flow in that slot. The price flow j (i.e., the user accessing flow j) is willing to pay in slot m is designated as c[j,m, DRC[j,m]]. Here DRC[j,m] denotes the rate at which this user may be served in slot m. A user may specify the price statically, such as a prespecified price for each value of DRC. Alternatively, a user may specify the price dynamically, such as to change the price during the lifetime of an application. This allows the user to have some control over the price to respond to a changing channel condition and to achieve a desired QoS. An operator may use such a scheduler along with the scheduler presented for the inter and intra user QoS. This allows an operator to specify at least two types of pricing schemes. For inter and intra user QoS scheduler, the operator may specify a static pricing scheme (based on static service level agreement) and at the same time, allow a dynamic pricing scheme for the adaptive frame structure based scheduler. A user may choose to use different schemes for different flows.

One embodiment divides time into several frames and makes scheduling decisions for each slot depending upon DRC values, QoS requirements, QoS violation statistics and price specified by each user. A frame structure basically gives the order in which user queues should be served in a round. The network decides in each scheduling round which flow/user to serve in a given slot for that round in order to achieve the desired goals. The frame structure, i.e., the order in which flows are served in each round, keeps varying and referred to as the AFS based algorithm.

The following definitions explain some notations used in the computation process. Given N queues (and one queue for each flow), assume that the QoS requirements for flow j are met if it is served at rate r[j]. An initial weight w[j] and time scale ts[j] are also pre-specified for each flow j. The process aims to provide rate guarantees to flow j, which may be monitored at every slot that is an integer multiple of the time scale (i.e., at every slot m*ts[j] where m is an integer).

Let start[j] be the slot when flow j initially started being considered to be served in a round. By the end of slot z, the system desires to serve S[j,z]=r[j]*(z-start[j]) bits where z=m*ts[j] for some integer m. Using one scheduling mechanism, the system is able to balance the number of (time) slots desired for allocation to a given flow and the number of bits desired to serve that flow.

Further, other parameters used for the AFS scheduler are given as:

slots_alloc[j,n]: number of slots allocated to queue (flow) j in round n.

slots_served[j,n]: number of slots when queue (flow) j was served in round n.

S_r[j,n]: number of bits to serve for flow j by the end of round n.

round_len[n]: length in number of slots of round n.

round_len_thres: A round length is upper bounded by this threshold.

B[n]; List of backlogged queues at the beginning of slot n.

$R_{out\_round}$[j,n]: number of bits served for queue j in round n by the scheduler.

$R_{out}$[j,n,g]: Number of bits served for queue j during the time interval [n,g] where g≧n.

Using the description given hereinabove, the deficit in bits for queue j at the beginning of round n is given by:

$$\text{def\_bits\_r}[j, n] = \max(S\_r[j, n-1] - \sum_{k=1}^{n-1} R_{\text{out\_round}}[j, k], 0), \forall n, \forall j \qquad (71)$$

When the deficit in bits is positive, the corresponding flow is lagging in service and is to be compensated. On the other hand excess service received by a flow is not explicitly penalized, but is indirectly penalized, as this flow would not be compensated, while other flows which are lagging in service would be compensated.

Further, a calculation of normalized deficit bits for flow j at the beginning of round n is given as:

$$\text{ndef\_bits\_r}[j, n] = \frac{\text{def\_bits\_r}[j, n]}{S\_r[j, n-1]}, \forall j, \forall n. \qquad (72)$$

The deficit in slots for queue j at the beginning of round n is given by:

$$\text{def\_slots\_r}[j, n] = \max(\sum_{k=1}^{n-1} \text{slots\_alloc}[j, k] - \sum_{k=1}^{n-1} \text{slots\_served}[j, k], 0), \forall n, \forall j \quad (73)$$

The process defines the normalized deficit slots for queue j at the beginning of round n as follows:

$$\text{ndef\_slots\_r}[j, n] = \frac{\text{def\_slots\_r}[j, n]}{\sum_{k=0}^{n-1} \text{slots\_alloc}[j, k]}, \forall j, \forall n. \quad (74)$$

Let lslot[n] be the last slot of round n and fslot[n] be the first slot of round n. Suppose aw[j,n] denotes the (adaptive) weight assigned to flow j for round n. This weight decides the number of slots that are allocated to flow j in round n.

An ordering is given to DRC values requested by users. Specifically, if $DRC_1[B,S]$ is better than $DRC_2[B,S]$ then $(B/S)_1 > (B/S)_2$. Here B is the number of bits per packet and S is the number of slots.

For each scheduling round of the AFS scheduler, the process computes the state variables given above for each round, and then computes weights for each flow at the beginning of each round to allocate a certain number of slots to this flow for that round. For this purpose, the process uses an adaptive weight computation mechanism and computes the frame structure for each round using a per-round service discipline.

Adaptive Weight Computation Mechanism

Let $\text{ndef\_bits\_r}_{thres,min}$ be a pre-specified threshold for ndef_bits_r. The process defines a set, ndefbits_set[n] at the beginning of round n as follows:

$$\text{ndefbits\_set}[n] = \{k : \text{ndef\_bits\_r}_k \geq \text{ndef\_bits\_r}_{thres,min}\}. \quad (75)$$

Let S_I[n] be the number of flows in the set at the beginning of round n. Similarly, $\text{ndef\_slots\_r}_{thres,min}$ a pre-specified threshold for ndef_slots_r. The process defines, ndefslots_set [n], at the beginning of round n as follows:

$$\text{ndefslots\_set}[n] = \{k : \text{ndef\_slots\_r}_k \geq \text{ndef\_slots\_r}_{thres,min}\}. \quad (76)$$

Let S_II[n] be the number of flows in this set at the beginning of round n.

For an arbitrary flow j, at the beginning of a round n, define the corresponding slot compensation function as follows:

$$\text{slot\_comp}[j,n] = \text{slot\_comp\_I}[j,n] * \text{slot\_comp\_II}[j,n], \text{ if } \text{ndef\_bits\_r}_j \geq \text{ndef\_bits\_r}_{thres,min} \quad (77)$$

$$\text{slot\_comp}[j,n] = 1, \text{ if ndef\_bits\_r}_j < \text{ndef\_bits\_r}_{thres,min}. \quad (78)$$

Here, $$\text{slot\_comp\_I}[j, n] = \frac{\text{ndef\_bits\_r}_j}{\text{ndef\_bits\_r}_{avg}[n]},$$

if $\text{ndef\_bits\_r}_j \geq \text{ndef\_bits\_r}_{thres,min}$ \quad (79)

$$\text{ndef\_bits\_r}_{avg}[n] = \frac{\sum_k \text{ndef\_bits\_r}_k}{S\_I[n]}, \text{ for all } k : k \in \text{ndefbits\_set}[n] \quad (80)$$

$$\text{slots\_comp\_I}[j,n] = 1, \text{ if ndef\_bits\_r}_j < \text{ndef\_bits\_r}_{thres,min}. \quad (81)$$

For each flow j, define two thresholds, $\text{slots\_comp\_I}_{thres,min}[j]$ and $\text{slots\_comp\_I}_{thres,max}[j]$ such that:

$$\text{slots\_comp\_I}_{thres,min}[j] \leq \text{slots\_comp\_I}[j,n] \leq \text{slots\_comp\_I}_{thres,max}[j], \forall j, \forall n \quad (82)$$

Use of these thresholds, along with the adaptive weight computation mechanisms described here, prevents any flow from consuming an unfairly large number of slots in a round, and at the same time does not penalized that flow beyond a given limit.

$$\text{slot\_comp\_II}[j, n] = \frac{\text{ndef\_slots\_r}_j}{\text{ndef\_slots\_r}_{avg}[n]}, \text{ if ndef\_slots\_r}_j \geq \text{ndef\_slots\_r}_{thres,min} \quad (83)$$

$$\text{slots\_comp\_II}[j,n]=1, \text{ if}$$
$$\text{ndef\_slots\_r}_j < \text{ndef\_slots\_r}_{thres,min}. \tag{84}$$

For each flow j, define two thresholds, slots_comp_$\text{II}_{thres,min}[j]$ and slots_comp_$\text{II}_{thres,max}[j]$ such that:

$$\text{slots\_comp\_II}_{thres,min}[j] \leq \text{slots\_comp\_II}[j,n]$$
$$\leq \text{slots\_comp\_II}_{thres,max}[j], \forall j, \forall n. \tag{85}$$

At the beginning of each round, flows are divided into four groups as given in Table 5.

TABLE 5

| Group | ndef_bits_$r_{flow} \geq$ ndef_bits_$r_{thres, min}$ | ndef_slots_$r_{flow} \geq$ ndef_slots_$r_{thres, min}$ |
|---|---|---|
| Group I | Yes | No |
| Group II | No | Yes |
| Group III | Yes | Yes |
| Group IV | No | No |

At the beginning of an arbitrary round n, for each flow j belonging to either group II or IV, use slot_comp[j,n]=1. For each flow j belonging to group I at the beginning of round n, apply the following:

$$\text{slot\_comp}[j,n]=\text{slot\_comp\_I}[j,n]. \tag{86}$$

If flow j belongs to group III at the beginning of round n, apply the following:

$$\text{slot\_comp}[j,n]=\text{slot\_comp\_I}[j,n]*\text{slot\_comp\_II}[j,n]. \tag{87}$$

The process then computes an adaptive weight for flow j, wherein the adaptive weight for a non-empty queue in round n is as follows:

$$aw[j,n] = \text{slot\_comp}[j,n] * w[j] * \frac{r[j]}{r_{min,n}}, \forall j \in B[n] \tag{88}$$

Here, $r_{min,n}=\min\{r[k]:k \in B[n]\}$. For each flow j, define a threshold $aw_{thres,max}[j]$ and use this threshold to ensure that:

$$aw[j,n] \leq aw_{thres,max}[j], \forall j, \forall n. \tag{89}$$

Next, these adaptive weights are applied to compute the number of slots that would be allocated to each flow and the length of each round such that:

$$\text{slots\_alloc}[j,n] \propto aw[j,n], \forall j, j \in B[n] \tag{90}$$

$$\sum_{j:j \in B[n]} \text{slots\_alloc}[j,n] \leq \text{round\_len}[n] \leq \text{round\_len\_thres}, \forall n. \tag{91}$$

Per-Round Scheduling Discipline

Once each flow has been allocated, some number of slots in a round and length of the round has been computed. The next step is to select a flow to serve in any given slot. In any given arbitrary slot m in round n, if a packet selected in one of the previous slot is still being served, a new flow to be served does not need to be selected. On the other hand, if no packet is being served in this slot m in round n, a flow to serve is selected in the following manner. Compute the following selection metric for slot m of round n for flow j, $$YY[j,n,m]=c[j,m,DRC[j,m]]*\text{wait\_comp}[j,n,m]*DRC[j,m], \forall n, \tag{92}$$

for each slot m where the scheduler needs to select a new flow to serve, and for each flow j such that $j \in B[n]$ and slots_served $[j,n] < \theta(j)*$slots_alloc$[j,n]$. Here, $\theta(j)$ is pre-specified for each flow j, and wait_comp is the waiting compensation given to flows to improve their delay bounds. Let wait[j,n,m] be the waiting time of the head of line packet of flow j at the beginning of slot m in round n.

$$\text{wait\_comp}[j,n,m] = \frac{\text{wait}[j,n,m]}{\text{wait\_avg}[n,m]}, \forall j, j: j \in B_j \tag{93}$$

and flow j has at least one packet pending at the beginning of slot m in the round n. Next, compute:

$$\text{wait\_avg}[n,m] = \frac{\sum_k \text{wait}[k,n,m]}{\text{wait\_num}[n,m]}, \tag{94}$$

for all flows k such that $k \in B[n]$ and number of such flows is wait_num[n,m]. For each flow j, two thresholds, wait_$\text{comp}_{thres,min}[j]$ and wait_$\text{comp}_{thres,max}[j]$ are assigned and used to ensure that $$\text{wait\_comp}_{thres,min}[j] \leq \text{wait\_comp}[j,n,m] \leq \text{wait\_comp}_{thres,max}[j], \forall m, \forall n, \forall j. \tag{95}$$

A flow with the maximum value of the selection metric YY is selected to be served in any given slot by this AFS scheduler.

Figure 20:
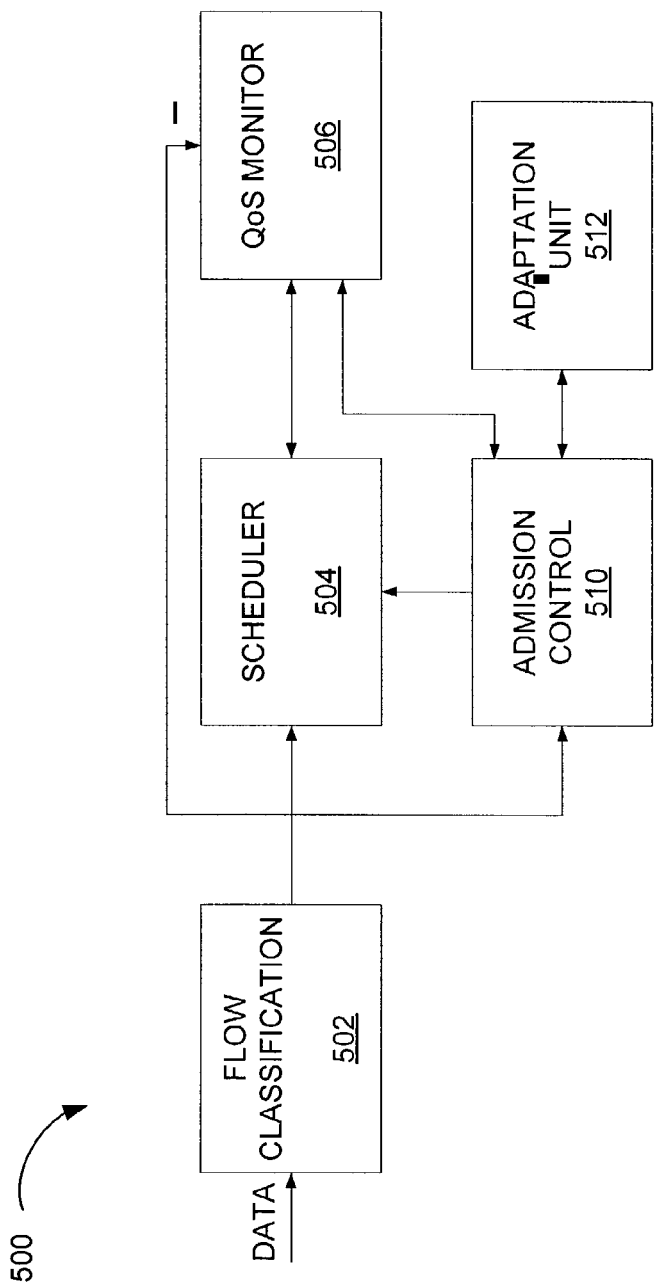
FIG. 20 is a block diagram of an Access Network (AN) element in a High Rate Packet Data type system supporting multiple application flows having Quality of Service (QoS) requirements.

An AN element according to one embodiment is illustrated in FIG. 20. The AN element 500 receives application flow data and processes the data for transmission to a user. The AN element 500 schedules multiple application flows, wherein each flow has QoS requirements. Note the application flows may include a Best Effort flow, as described hereinabove. The AN element 500 includes a flow classification unit 502 adapted to identify the traffic profile and QoS profile associated with the flow and map the flow to a class, or QSG. The flow classification unit 502 is coupled to a scheduler 504, an admission control unit 510, and a QoS monitor 506. The scheduler 504 may implement any of a variety of scheduling algorithms, including, but not limited to, a Proportional Fair (PF) algorithm and an adaptive weighted PF algorithm. The admission control unit 510 applies an admission control scheme to the application flows received by the AN 500. The admission control unit 510 evaluates each new flow requested based on QoS and network statistics and determines if sufficient resources are available to support the new flow. An adaptation unit is coupled to the admission control unit, wherein the ASF are updated. The adaptation unit 512 is adapted to perform preemption determination of currently active application flows. Preemption considers the performance of a given flow with respect to data rate, slots used, and other QoS and network statistics. The QoS monitor is adapted to monitor the QoS requirements of a received application flow. Note that the AN element 500 typically receives multiple flows and selects among them for transmission to a user. The scheduler 504 receives information from admission control unit 510 regarding whether a new flow is admitted. Scheduler 504 receives QoS statistics and other information from the QoS monitor 506, wherein the scheduler 504 applies the QoS information to select a flow for transmission.

Presented herein are methods and apparatus for admission control, preemption and scheduling of application flows in a wireless communication system. Admission control considers requested data rate of a new flow, and compares this to the available resources. Once admitted, the flow is provided to a scheduler, which is adapted to perform per flow and per user analysis to select a user for transmission in each slot or designated time period.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for admission control in a communication system supporting Internet Protocol (IP) applications, the communication system including an Access Network (AN) and a plurality of Access Terminals (ATs), each of the ATs sending a requested data rate to the AN, the communication system supporting application flows having QoS requirements to the ATs, the method comprising:
determining available resources in the communication system;
receiving a request for a first application flow having a first traffic profile and a first QoS profile;
determining if the available resources support the request for the first application flow;
denying the first application flow if the first application flow has a corresponding data rate greater than an average requested data rate; and
admitting the first application flow if the corresponding data rate is not greater than the average requested data rate, and if the available resources support the request for the first application flow,
wherein the method further comprises:
determining QoS statistics for the first application flow;
comparing the QoS statistics for the first application flow to other current flows in the sector; and
updating the available resources and reserved resources in response to comparing the QoS statistics for the first application flow to other current flows in the sector.

2. The method as in claim 1, wherein determining if the available resources support the first application flow; comprises:
determining reserved resources in the communication system;
comparing the reserved resources to the capacity of the communication system; and
determining the available resources as the difference between the capacity and the reserved resources.

3. The method as in claim 2, further comprising:
determining an adaptive subscription factor for the first application flow.

4. The method as in claim 3, further comprising:
updating the adaptive subscription factor based on Quality of Service (QoS) statistics for the first application flow.

5. The method as in claim 1, further comprising:
determining user presence of the first application flow in a sector of the wireless communication system; and
determining a sample duration for the first application flow,
wherein determining QoS statistics for the first application flow comprises:
determining QoS statistics for the first application flow during the sample duration.

6. The method as in claim 5, wherein a first sample duration is associated with rate violations and a second sample duration is associated with delay violations.

7. The method as in claim 5, wherein comparing the QoS statistics for the first application flow to other current flows in the sector comprises:
calculating a first fraction of slots used by flows having QoS requirements during the sample period;
calculating a second fraction of slots used by the first application flow during the sample period;
calculating a third fraction of QoS flows corresponding to a first QoS statistic;

comparing the third fraction to a corresponding threshold value; and evaluating an adaptive subscription in response to comparing the third fraction to a corresponding threshold value.

8. An apparatus for admission control in a communication system supporting Internet Protocol (IP) applications, the communication system including an Access Network (AN) and a plurality of Access Terminals (ATs), each of the ATs sending a requested data rate to the AN, the communication system supporting application flows having QoS requirements to the ATs, the apparatus comprising:

means for determining available resources in the communication system;

means for receiving a request for a first application flow having a first traffic profile and a first QoS profile;

means for determining if the available resources support the request for the first application flow;

means for denying the first application flow if the first application flow has a corresponding data rate greater than an average requested data rate; and means for admitting the first application flow if the corresponding data rate is not greater than the average requested data rate, and if the available resources support the request for the first application flow, wherein the apparatus further comprises:

means for determining QoS statistics for the first application flow;

means for comparing the QoS statistics for the first application flow to other current flows in the sector; and means for updating the available resources and reserved resources in response to comparing the QoS statistics for the first application flow to other current flows in the sector.

9. An apparatus adapted for admission control in a communication system, comprising:

at least one processor configured to:

determine available resources in the communication system;

receive a request for a first application flow having a first traffic profile and a first QoS profile;

determine if the available resources support the request for the first application flow;

deny the first application flow if the first application flow has a corresponding data rate greater than an average requested data rate; and admit the first application flow if the corresponding data rate is not greater than the average requested data rate, and if the available resources support the request for the first application flow, wherein the processor is further configured to:

determine QoS statistics for the first application flow;

compare the QoS statistics for the first application flow to other current flows in the sector; and update the available resources and reserved resources in response to comparing the QoS statistics for the first application flow to other current flows in the sector.

10. The apparatus of claim 9, further comprising at least one memory element configured to store instructions to be executed by the at least one processor.

11. A processor-readable medium encoded with processor-executable instructions for:

determining available resources in the communication system;

receiving a request for a first application flow having a first traffic profile and a first QoS profile;

determining determining if the available resources support the request for the first application flow;

denying the first application flow if the first application flow has a corresponding data rate greater than an average requested data rate; and admitting the first application flow if the corresponding data rate is not greater than the average requested data rate, and if the available resources support the request for the first application flow, wherein the processor-readable medium further comprises processor-executable instructions for:

determining QoS statistics for the first application flow;

comparing the QoS statistics for the first application flow to other current flows in the sector; and updating the available resources and reserved resources in response to comparing the QoS statistics for the first application flow to other current flows in the sector.

* * * * *